United States Patent
Guo

(10) Patent No.: US 9,173,244 B2
(45) Date of Patent: Oct. 27, 2015

(54) METHODS FOR ESTABLISHING AND USING PUBLIC PATH, M2M COMMUNICATION METHOD, AND SYSTEMS THEREOF

(71) Applicant: Huawei Technologies Co., Ltd., Shenzhen, Guangdong (CN)

(72) Inventor: Xiaolong Guo, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 116 days.

(21) Appl. No.: 13/915,331

(22) Filed: Jun. 11, 2013

(65) Prior Publication Data

US 2013/0272247 A1    Oct. 17, 2013

Related U.S. Application Data

(63) Continuation of application No. PCT/CN2011/084073, filed on Dec. 15, 2011.

(30) Foreign Application Priority Data

Dec. 15, 2010  (CN) .......................... 2010 1 0590124

(51) Int. Cl.
- *H04W 76/06* (2009.01)
- *H04W 76/02* (2009.01)
- *H04W 4/00* (2009.01)

(52) U.S. Cl.
CPC ............ *H04W 76/062* (2013.01); *H04W 76/02* (2013.01); *H04W 4/005* (2013.01)

(58) Field of Classification Search
None
See application file for complete search history.

(56) References Cited

U.S. PATENT DOCUMENTS

| 8,811,961 B2* | 8/2014 | Lee et al. .................... 455/415 |
| 2006/0227754 A1* | 10/2006 | Ko ................................ 370/338 |
| 2009/0217038 A1 | 8/2009 | Lehtovirta et al. |

(Continued)

FOREIGN PATENT DOCUMENTS

| CN | 1859374 A | 11/2006 |
| CN | 101176330 A | 5/2008 |
| CN | 101588570 A | 11/2009 |
| CN | 101860807 A | 10/2010 |
| EP | 2141862 A1 | 6/2010 |
| WO | WO 2009103621 A1 | 8/2009 |
| WO | WO 2010017913 A1 | 2/2010 |
| WO | WO 2010128773 A2 | 11/2010 |

OTHER PUBLICATIONS

International Search Report in corresponding PCT Patent Application No. PCT/CN2011/084073 (Mar. 22, 2012).

(Continued)

*Primary Examiner* — Hong Cho
(74) *Attorney, Agent, or Firm* — Leydig, Voit & Mayer, Ltd.

(57) ABSTRACT

Embodiments of the present invention, relating to the communications field, provide methods for establishing and using a public path, an M2M communication method, and systems thereof. To reduce occupied network resources and improve service processing efficiency of a network, an embodiment of the present invention provides the following technical solution: obtaining characteristic information of a public path, where the public path is corresponding to an MTC device in a one-line transmission group; establishing the public path according to the characteristic information; performing, by the MTC device in the one-line transmission group, data transmission with an MTC server by using the public path; and releasing the public path when the data transmission between the MTC device in the one-line transmission group and the MTC server is completed. The present invention is applicable to M2M communication.

21 Claims, 14 Drawing Sheets

(56) References Cited

U.S. PATENT DOCUMENTS

| | | | | |
|---|---|---|---|---|
| 2010/0272013 | A1* | 10/2010 | Horn et al. | 370/328 |
| 2011/0141884 | A1* | 6/2011 | Olsson et al. | 370/225 |
| 2011/0170530 | A1* | 7/2011 | Akiyoshi | 370/338 |
| 2011/0270973 | A1* | 11/2011 | Liao | 709/224 |
| 2011/0271320 | A1* | 11/2011 | Andreasen | 726/1 |
| 2011/0310731 | A1* | 12/2011 | Park et al. | 370/230 |
| 2012/0002537 | A1* | 1/2012 | Bao et al. | 370/221 |
| 2012/0033613 | A1* | 2/2012 | Lin et al. | 370/328 |
| 2012/0044865 | A1* | 2/2012 | Singh et al. | 370/328 |
| 2012/0087360 | A1 | 4/2012 | Chen et al. | |
| 2013/0044594 | A1* | 2/2013 | Kim et al. | 370/229 |

OTHER PUBLICATIONS

Written Opinion of the International Searching Authority in corresponding PCT Patent Application No. PCT/CN2011/084073 (Mar. 22, 2012).

"$3^{rd}$ Generation Partnership Project; Technical Specification Group Services and System Aspects; System Improvements for Machine-Type Communications; (Release 10)," 3GPP TR 23.888, V1.0.0, pp. 1-80, $3^{rd}$ Generation Partnership Project, Valbonne, France (Jul. 2010).

"Evolved registration of device identity," 3GPP TSG SA WG2 Meeting #79, Kyoto, Japan, TD S2-102227, $3^{rd}$ Generation Partnership Project, Valbonne, France (May 10-14, 2010).

"A solution on MTC Devices communicating with one or more MTC Servers," San Francisco, California, TD S2-101080, $3^{rd}$ Generation Partnership Project, Valbonne, France (Feb. 22-26, 2010).

"Indications for MTC in RRC Signaling," 3GPP TSG RAN WG2 Meeting #72, Jacksonville, Florida, R2-106190, $3^{rd}$ Generation Partnership Project, Valbonne, France (Nov. 15-19, 2010).

"APN based solution for MTC Groups," 3GPP TSG SA WG2 Meeting #77, Shenzhen, China, TD S2-100393, $3^{rd}$ Generation Partnership Project, Valbonne, France (Jan. 18-22, 2010).

"Sol. 6 Update: Downlink radio bearer mapping, Standalone L-GW," Shenzhen, China, TD S2-100252, $3^{rd}$ Generation Partnership Project, Valbonne, France (Jan. 18-22, 2010).

* cited by examiner

METHODS FOR ESTABLISHING AND USING PUBLIC PATH, M2M COMMUNICATION METHOD, AND SYSTEMS THEREOF

CROSS-REFERENCE TO RELATED APPLICATIONS

This application is a continuation of International Patent Application No. PCT/CN2011/084073, filed on Dec. 15 2011, which claims priority to Chinese Patent Application No. 201010590124.1, filed on Dec. 15, 2010, both of which are hereby incorporated by reference in their entireties.

FIELD OF THE INVENTION

The present invention relates to the communications field, and in particular, to methods for establishing and using a public path, an M2M communication method, and systems thereof in a wireless communication network.

BACKGROUND OF THE INVENTION

M2M (machine to machine) communication services will account for a larger share in the market of future communications technologies. M2M is an integration of the wireless communication and information technology, and capable of implementing one-way communication and two-way communication, which is applicable to scenarios such as security detection, automatic vending machines, and cargo tracking In the M2M technology, MTC (Machine Type Communications, machine type communications) application architecture mainly includes an MTC Device (MTC device), an MTC Server (MTC server), a network part (including logical function entities such as a network element of an access network, a network element of a core network, and an HSS). The MTC Server stores related data information of M2M devices or groups for providing MTC services. For example, the MTC Device is a water or electricity meter, and the MTC Server is a reading and processing server for the water or electricity meter, which stores the configuration information of the water or electricity meter and processes the data read on the meter accordingly.

During implementation of the present invention, the inventors find that the prior art has at least the following problems: During data transmission between a large number of MTC Devices and the same MTC Server, even though data is transmitted between the MTC Devices and the MTC Server by using the same path, each MTC Device still needs to perform operations such as establishing and releasing a bearer connection with the MTC Server, respectively. In addition, each operation for establishing or releasing a bearer connection involves signaling transmission between a plurality of network element devices. Therefore, lots of network resources are occupied, thereby reducing service processing efficiency of the network.

SUMMARY OF THE INVENTION

Embodiments of the present invention provide methods for establishing and using a public path, an M2M communication method, and systems thereof in a wireless communication network, capable of reducing occupied network resources and improving service processing efficiency of the network.

Embodiments of the present invention employ the following technical solutions:

A method for establishing a public path in a wireless communication network includes:

sending, by a mobility management entity, a Create Session Request message to a serving gateway;

receiving a Create Session Response message sent by the serving gateway, where the Create Session Response message is a response to the Create Session Request message and carries a network address of the serving gateway and tunnel endpoint ID information;

sending a Create Bearer Request message to a base station, where the Create Bearer Request message carries the network address of the serving gateway and the tunnel endpoint ID information; and receiving a Create Bearer Request Response sent by the base station to complete establishment of the public path.

A method for establishing a public path in a wireless communication network includes:

sending, by a base station, an Attach Request to a mobility management entity;

receiving an Initial Context Setup Request or Attach Accept message sent by the mobility management entity, where the Initial Context Setup Request or Attach Accept message is a response to the Attach Request and carries a network address of a serving gateway and tunnel endpoint ID information; and sending an Initial Context Setup Response or Attach Complete message to the mobility management entity to complete establishment of the public path, where the Initial Context Setup Response or Attach Complete message carries a network address of the base station and tunnel endpoint ID information.

A method for using a unidirectional uplink public path in a wireless communication network includes:

receiving, by a base station, an RRC Connection Request message sent by an MTC device;

sending an RRC Connection Setup message to the MTC device;

receiving an RRC Connection Setup Complete message sent by the MTC device, where the RRC Connection Setup Complete message carries a public path association ID;

determining, according to the public path association ID, the public path corresponding to the MTC device; and when receiving uplink data sent by the MTC device, sending the uplink data to a peer node of the public path by using the public path.

An M2M communication method includes:

obtaining characteristic information of a public path, where the public path is corresponding to an MTC device in a one-line transmission group;

establishing the public path according to the characteristic information;

performing, by the MTC device in the one-line transmission group, data transmission with an MTC server by using the public path; and releasing the public path when the data transmission between the MTC device in the one-line transmission group and the MTC server is completed.

A system for establishing a public path in a wireless communication network includes:

a mobility management entity, configured to send a Create Session Request message to a serving gateway; receive a Create Session Response message sent by the serving gateway; send a Create Bearer Request message to a base station, where the Create Bearer Request message carries a network address of the serving gateway and tunnel endpoint ID information; and receive a Create Bearer Request Response sent by the base station to complete establishment of the public path;

the serving gateway, configured to receive the Create Session Request message sent by the mobility management entity; and send the Create Session Response message to the mobility management entity, where the Create Session Response message carries the network address of the serving gateway and the tunnel endpoint ID information; and the base station, configured to receive the Create Bearer Request message sent by the mobility management entity; and send the Create Bearer Request Response to the mobility management entity.

A system for establishing a public path in a wireless communication network includes:

a base station, configured to send an Attach Request to a mobility management entity; receive an Initial Context Setup Request or Attach Accept message sent by the mobility management entity; and send an Initial Context Setup Response or Attach Complete message to the mobility management entity to complete establishment of the public path, where the Initial Context Setup Response or Attach Complete message carries a network address of the base station and tunnel endpoint ID information; and the mobility management entity, configured to receive the Attach Request sent by the base station; obtain a network address of a serving gateway and tunnel endpoint ID information; send the Initial Context Setup Request or Attach Accept message to the base station, where the Initial Context Setup Request or Attach Accept message carries the network address of the serving gateway and the tunnel endpoint ID information; and receive the Initial Context Setup Response or Attach Complete message sent by the base station.

A system for using a unidirectional uplink public path in a wireless communication network includes:

an MTC device, configured to send an RRC Connection Request message to a base station; receive an RRC Connection Setup message sent by the base station; and send an RRC Connection Setup Complete message to the base station, where the RRC Connection Setup Complete message carries a public path association ID; and the base station, configured to receive the RRC Connection Request message sent by the MTC device; send the RRC Connection Setup message to the MTC device; receive the RRC Connection Setup Complete message sent by the MTC device; determine, according to the public path association ID in the RRC Connection Setup Complete message, the public path corresponding to the MTC device; and send uplink data to a peer node of the public path by using the public path when receiving the uplink data sent by the MTC device.

An M2M communication system includes:

a network unit, configured to obtain characteristic information of a public path, where the public path is corresponding to an MTC device in a one-line transmission group; establish the public path according to the characteristic information; and release the public path when data transmission between the MTC device in the one-line transmission group and an MTC server is completed; and the MTC server, configured to perform data transmission with the MTC device in the one-line communication group by using the public path corresponding to the MTC device in the one-line communication group.

According to the methods for establishing and using a public path, the M2M communication method, and the systems thereof in the wireless communication network, characteristic information of a public path is obtained, where the public path is corresponding to an MTC device in a one-line transmission group; the public path is established according to the characteristic information; and the MTC device in the one-line transmission group performs data transmission with an MTC server by using the public path and releases the public path when the data transmission between the MTC device in the one-line transmission group and the MTC server is completed. Therefore, when MTC Devices in the same group perform data transmission with the MTC Server, the public path involves only operations of establishing and releasing a bearer once, thereby reducing signaling transmission between nodes. In this way, the occupied network resources in the M2M communication are reduced and the service processing efficiency of an M2M network is improved.

BRIEF DESCRIPTION OF THE DRAWINGS

To illustrate the technical solutions in the embodiments of the present invention more clearly, the following briefly describes the accompanying drawings for describing the embodiments of the present invention. Apparently, the accompanying drawings in the following description merely show some embodiments of the present invention, and persons of ordinary skill in the art can derive other drawings from these accompanying drawings without creative efforts.

DETAILED DESCRIPTION OF THE EMBODIMENTS

The following clearly and completely describes the technical solutions according to the embodiments of the present invention with reference to the accompanying drawings in the embodiments of the present invention. Apparently, the embodiments in the following description are merely a part rather than all of the embodiments of the present invention. All other embodiments obtained by persons of ordinary skill in the art based on the embodiments of the present invention without creative efforts shall fall within the protection scope of the present invention.

Figure 1:
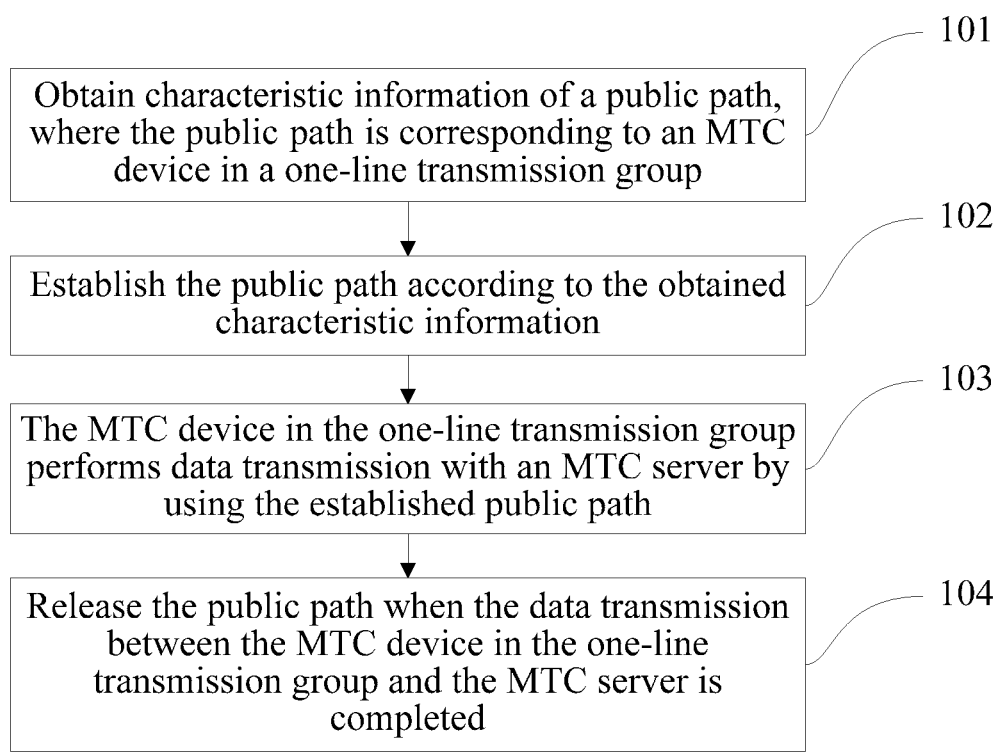
FIG. 1 is a schematic flow chart of an M2M communication method according to an embodiment of the present invention.

To reduce occupied network resources and improving service processing efficiency of a network, an embodiment of the present invention provides an M2M communication method, as shown in FIG. 1, including:

101. Obtain characteristic information of a public path, where the public path is corresponding to an MTC device in a one-line transmission group.

In this embodiment, MTC devices in the one-line transmission group have the same data transmission path and generally have the same destination address (the same MTC Server) and/or QoS. The same data transmission path may be a path from an eNB (evolved NodeB, evolved Node B) to an S-GW (Serving Gateway, serving gateway) and from the S-GW to a P-GW (Packet Data Network Gateway, packet data network gateway); or a path from an eNB to an S-GW; or a path from an eNB to an S-GW, from the S-GW to a P-GW, and from the P-GW to an MTC Server; or a path from an S-GW to a P-GW; or a path from an S-GW to a P-GW and from the P-GW to an MTC Server.

The characteristic information of the public path includes information such as a first node and a last node of the public path and a data transmission direction of the public path.

102. Establish the public path according to the characteristic information.

In this embodiment, the public path may be established or released by using node-level signaling, or be established through configuration (similar to a PVC (Permanent Virtual Circuit, permanent virtual circuit) or an SVC (Switched Virtual Circuit, switched virtual circuit) of the ATM (Asynchronous Transfer Mode, asynchronous transfer mode) mechanism). In addition, the establishment and release may be subject to configuration trigger or time trigger. For example, an MTC Device group (for example, water meters) under an eNB1 randomly sends data only during 3:00-4:00 a.m. In this case, establishment of the public path may be triggered at 2:59 a.m., and release of the public path is triggered at 3:01 a.m. Certainly, if the terminal sends data constantly, the public path may be not deleted after being established and become a "permanent path".

For example, a first node and a last node of the public path and a data transmission direction of the public path may be determined according to the characteristic information; a tunnel may be established between the first node and the last node; a node of the tunnel may store the network address and interface information of an upper-level node of the node in the case of uplink data transmission; a node of the tunnel may store the network address and interface information of a lower-level node of the node in the case of downlink data transmission; and a node of the tunnel may store the network addresses and interface information of an upper-level node and a lower-level node of the node in the case of uplink and downlink data transmission.

In an application scenario of a 3GPP network, establishment of a public path may be triggered by an MME (Mobility Management Entity, mobility management entity), or an eNB, or a P-GW; and may alternatively be triggered by another entity and notified to the MME, the eNB or the P-GW to establish a corresponding public path. In addition, the public path may be, for example, a path between an eNB and an MTC Server (including a path in an SAE network from an eNB to an S-GW, from the S-GW to a P-GW, and from the P-GW to an MTC Server; a path in a UMTS network from an RNC to an SGSN, from the SGSN to a GGSM, and from the GGSN to an MTC Server; the SAE network is used as an example in the present invention, and the case is similar for the UMTS network, which is not detailed here), a path between an eNB and a P-GW (that is, a path from an eNB to an S-GW and from the S-GW to a P-GW), or a path between an S-GW and a P-GW. In addition, the public path may be an uplink path, a downlink path or a bidirectional path. The following describes the process for establishing the public path in further detail with reference to the above different cases.

Figure 2:
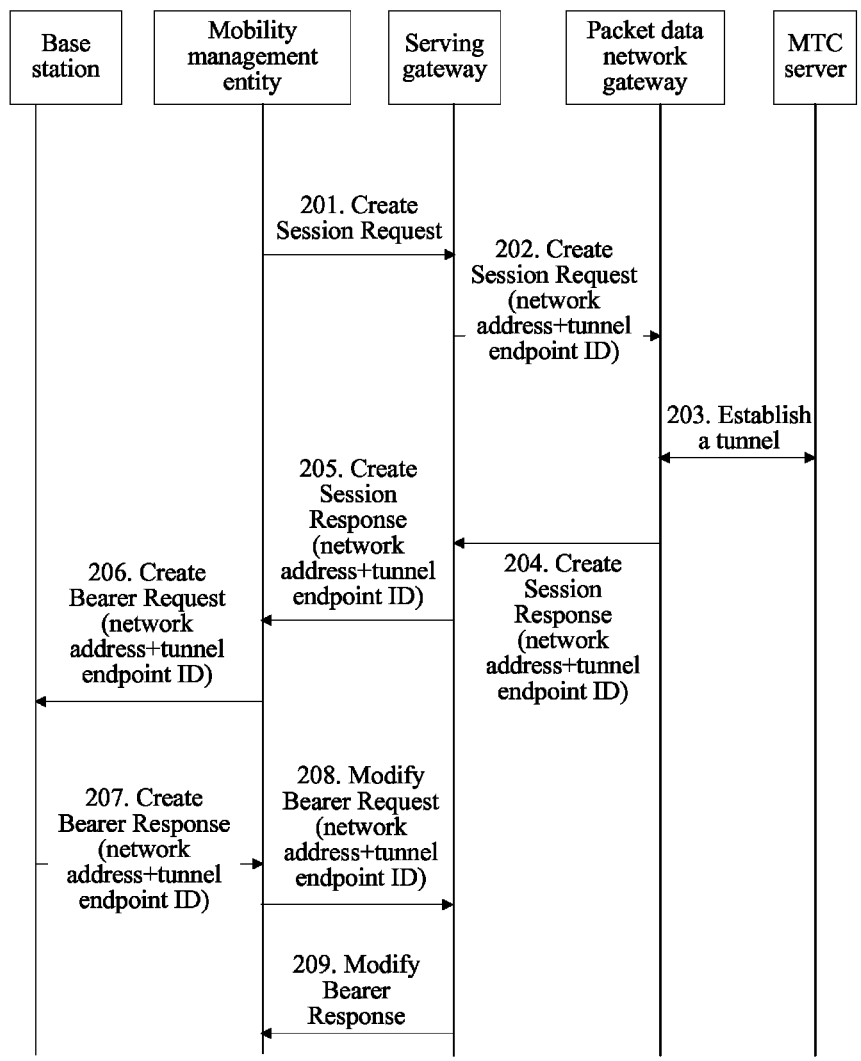
FIG. 2 is a schematic flow chart of a method for an MME to trigger establishment of a bidirectional public path from an eNB to an MTC Server according to an embodiment of the present invention.

As shown in FIG. 2, in M2M communication according to this embodiment, an MME triggers establishment of a bidirectional public path from an eNB to an MTC Server, including:

201. An MME determines to establish a bidirectional public path for a group of MTC Devices due to configuration trigger, time trigger or another trigger condition, and sends a Create Session Request (Create Session Request) message to an S-GW.

202. The S-GW sends the Create Session Request message to a P-GW, where the Create Session Request message carries the IP address and TEID (Tunnel endpoint ID, tunnel endpoint ID) information of the S-GW. After receiving the Create Session Request message, the P-GW records the IP address and TEID information of the S-GW. In this way, a downlink path from the P-GW to the S-GW is established.

The IP address may be carried in a transferred GTP message parameter, or may be carried in the source address of a sent IP packet.

In addition, the Create Session Request message may also carry an information indication, where the information indication is used to indicate whether the P-GW needs to return the IP address or TEID information of the P-GW.

203. The P-GW establishes a tunnel with an MTC Server.

The established tunnel may be, for example, an IP in IP tunnel, a GRE (Generic Routing Encapsulation, Generic Routing Encapsulation) tunnel, or an IPSEC (Internet Protocol Security) tunnel. In addition, for the specific method for establishing the tunnel, reference may be made to the prior art, which is not detailed here.

204. The P-GW sends a Create Session Response (Create Session Response) message to the S-GW, where the Create Session Response message carries the IP address and TEID information of the P-GW. After receiving the Create Session Response message, the S-GW records the IP address and TEID information of the P-GW. In this way, an uplink path from the S-GW to the P-GW is established.

205. The S-GW sends the Create Session Response message to the MME, where the Create Session Response message carries the IP address and TEID information of the S-GW. After receiving the Create Session Response message, the MME obtains the IP address and TEID information of the S-GW from the received Create Session Response message.

206. The MME sends a Create Bearer Request message to an eNB, where the Create Bearer Request message carries the IP address and TEID information of the S-GW. After receiving the Create Bearer Request message, the eNB records the IP address and TEID information of the S-GW. In this way, an uplink path from the eNB to the S-GW is established.

207. The eNB sends a Create Bearer Request Response to the MME, where the Create Bearer Request Response carries the IP address and TEID information of the eNB. After receiving the Create Bearer Request Response, the MME obtains the IP address and TEID information of the eNB from the Create Bearer Request Response.

208. The MME sends a Modify Bearer Request message to the S-GW, where the Modify Bearer Request message carries the IP address and TEID information of the eNB. After receiving the Modify Bearer Request message, the S-GW records the IP address and TEID information of the eNB. In this way, a downlink path from the S-GW to the eNB is established.

209. The S-GW sends a Modify Bearer Response message to the MME.

In addition, when the public path to be established is a part of a bidirectional path from the eNB to the MTC Server, some steps in the embodiment illustrated in FIG. 2 may be properly skipped during specific implementation. For example, if the public path to be established is a bidirectional path from the eNB to the P-GW, the public path may be established with step 203 in the embodiment illustrated in FIG. 2 skipped. If the public path to be established is a bidirectional path from the eNB to the S-GW, the public path may be established with steps 202 to 204 in the embodiment illustrated in FIG. 2 skipped. If the public path to be established is a bidirectional path from the S-GW to the P-GW, the public path may be established with steps 203, and 206 to 209 in the embodiment illustrated in FIG. 2 skipped. Other embodiments are similar and not detailed here.

Figure 3:
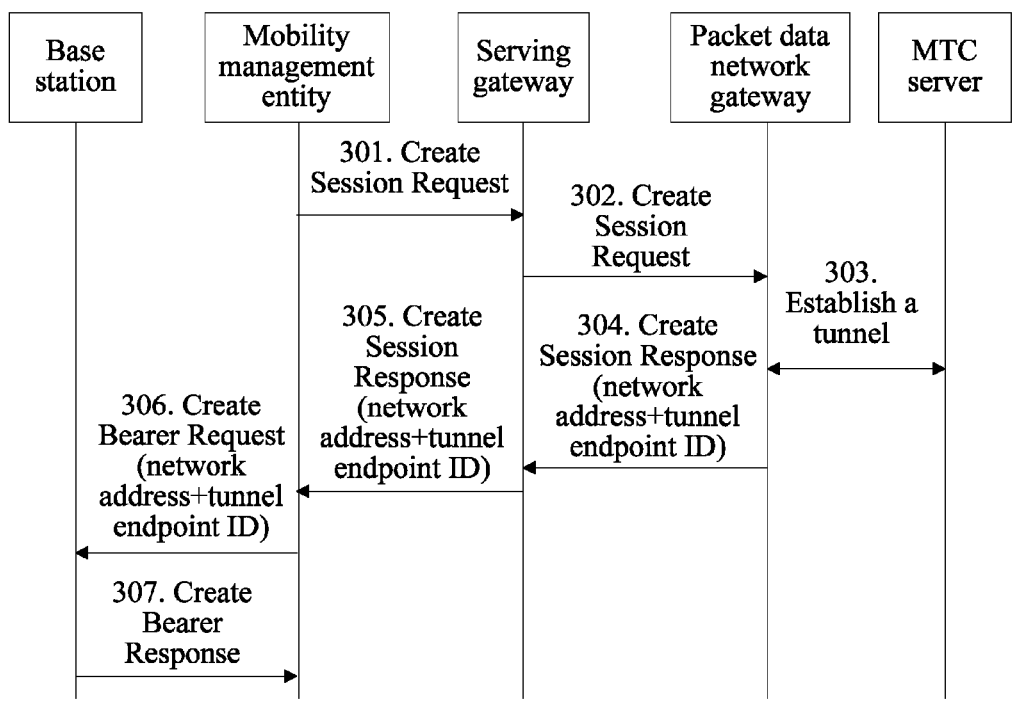
FIG. 3 is a schematic flow chart of a method for an MME to trigger establishment of an uplink public path from an eNB to an MTC Server according to an embodiment of the present invention.

As shown in FIG. 3, in M2M communication according to this embodiment, a method that an MME triggers establishment of an uplink public path from an eNB to an MTC Server includes:

301. An MME determines to establish an uplink public path for a group of MTC Devices due to configuration trigger, time trigger or another trigger condition, and sends a Create Session Request message to an S-GW.

302. The S-GW sends the Create Session Request message to a P-GW.

The Create Session Request message may also carry an information indication, where the information indication is used to indicate whether the P-GW needs to return the IP address or TEID information of the P-GW.

303. The P-GW establishes a tunnel with an MTC Server.

The established tunnel may be, for example, an IP in IP tunnel, a GRE (Generic Routing Encapsulation) tunnel, or an IPSEC tunnel. In addition, for the specific method for establishing the tunnel, reference may be made to the prior art, which is not detailed here.

304. The P-GW sends a Create Session Response message to the S-GW, where the Create Session Response message carries the IP address and TEID information of the P-GW. After receiving the Create Session Response message, the S-GW records the IP address and TEID information of the P-GW. In this way, a downlink path from the S-GW to the P-GW is established.

305. The S-GW sends the Create Session Response message to the MME, where the Create Session Response message carries the IP address and TEID information of the S-GW. After receiving the Create Session Response message, the MME obtains the IP address and TEID information of the S-GW from the received Create Session Response message.

306. The MME sends a Create Bearer Request message to an eNB, where the Create Bearer Request message carries the IP address and TEID information of the S-GW. After receiving the Create Bearer Request message, the eNB records the IP address and TEID information of the S-GW. In this way, an uplink path from the eNB to the S-GW is established.

The Create Bearer Request message may also carry an information indication, where the information indication is used to indicate that the eNB does not need to return the IP address or TEID information of the eNB to the S-GW.

307. The eNB sends a Create Bearer Request Response to the MME.

In addition, when the public path to be established is a part of an uplink path from the eNB to the MTC Server, some steps in the embodiment illustrated in FIG. 3 may be properly skipped during specific implementation. For example, if the public path to be established is an uplink path from the eNB to the P-GW, the public path may be established with step 303 in the embodiment illustrated in FIG. 3 skipped.

Figure 4:
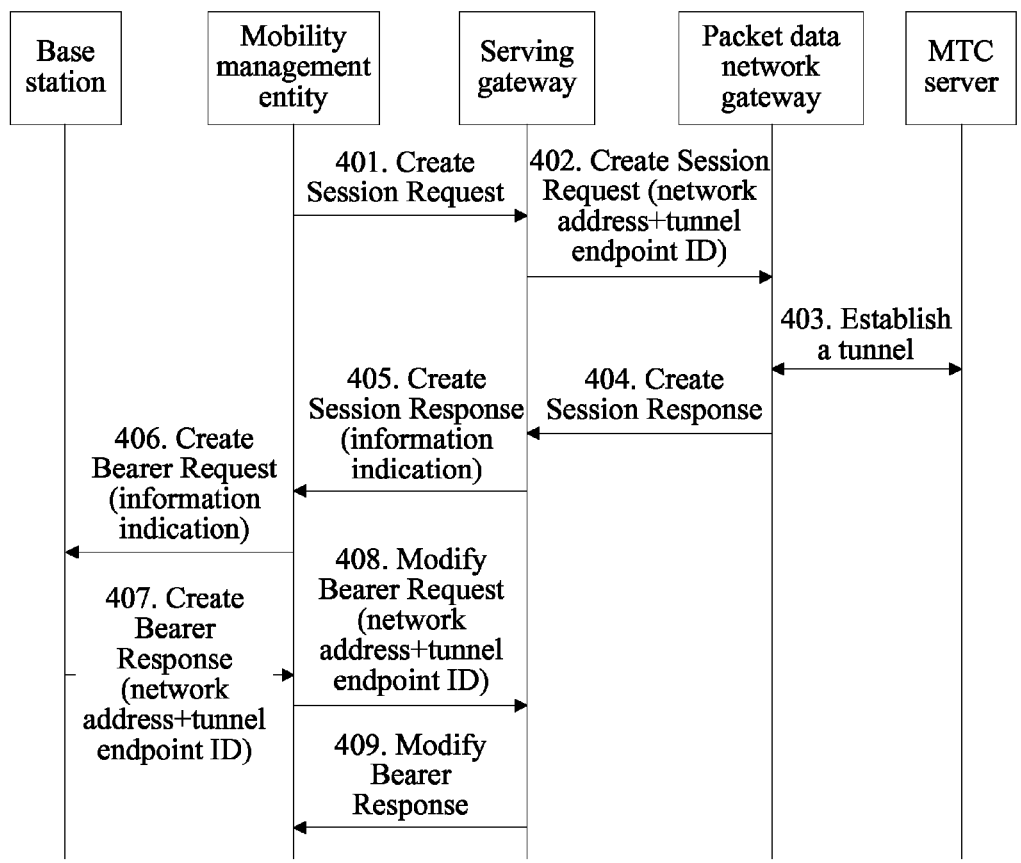
FIG. 4 is a schematic flow chart of a method for an MME to trigger establishment of a downlink public path from an eNB to an MTC Server according to an embodiment of the present invention.

As shown in FIG. 4, in M2M communication according to this embodiment, a method that an MME triggers establishment of a downlink public path from an eNB to an MTC Server includes:

401. An MME determines to establish a downlink public path for a group of MTC Devices due to configuration trigger, time trigger or another trigger condition, and sends a Create Session Request message to an S-GW.

402. The S-GW sends the Create Session Request message to a P-GW, where the Create Session Request message carries the IP address and TEID information of the S-GW. After receiving the Create Session Request message, the P-GW records the IP address and TEID information of the S-GW. In this way, a downlink path from the P-GW to the S-GW is established.

The IP address may be carried in a transferred GTP message parameter, or may be carried in the source address of a sent IP packet.

In addition, the Create Session Request message may also carry an information indication, where the information indication is used to indicate that the P-GW does not need to return the IP address or TEID information of the P-GW.

403. The P-GW establishes a tunnel with an MTC Server.

The established tunnel may be an IP in IP tunnel, a GRE tunnel, or an IPSEC tunnel. In addition, for the specific method for establishing the tunnel, reference may be made to the prior art, which is not detailed here.

404. The P-GW sends a Create Session Response message to the S-GW.

405. The S-GW sends the Create Session Response message to the MME, where the Create Session Response message may carry an information indication, and the information indication is used to indicate that the eNB needs to return the IP address or TEID information of the P-GW.

406. The MME sends a Create Bearer Request message to the eNB, where the Create Bearer Request message carries an information indication, and the information indication is used to indicate that the eNB needs to return the IP address or TEID information of the P-GW.

407. The eNB sends a Create Bearer Request Response to the MME, where the Create Bearer Request Response carries the IP address and TEID information of the eNB. After receiving the Create Bearer Request Response, the MME obtains the IP address and TEID information of the eNB from the Create Bearer Request Response.

408. The MME sends a Modify Bearer Request message to the S-GW, where the Modify Bearer Request message carries the IP address and TEID information of the eNB. After receiving the Modify Bearer Request message, the S-GW records the IP address and TEID information of the eNB. In this way, a downlink path from the S-GW to the eNB is established.

409. The S-GW sends a Modify Bearer Response message to the MME.

In addition, when the public path to be established is a part of a downlink path from the eNB to the MTC Server, some steps in the embodiment illustrated in FIG. 4 may be properly skipped during specific implementation. For example, if the public path to be established is a downlink path from the eNB to the P-GW, the public path may be established with step 403 in the embodiment illustrated in FIG. 4 skipped.

Figure 5:
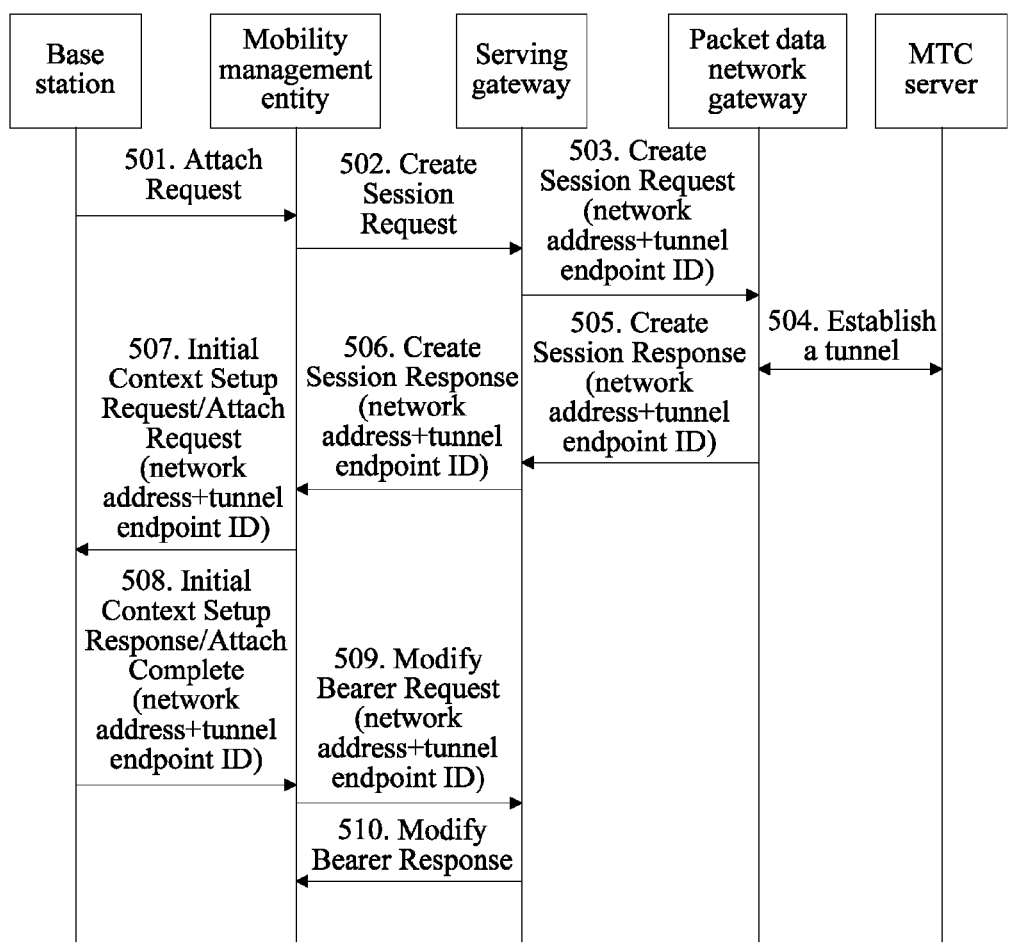
FIG. 5 is a schematic flow chart of a method for an eNB to trigger establishment of a bidirectional public path from the eNB to an MTC Server according to an embodiment of the present invention.

As shown in FIG. 5, in M2M communication according to this embodiment, a method that an eNB triggers establishment of a bidirectional public path from an eNB to an MTC Server includes:

501. An eNB determines to establish a bidirectional public path for a group of MTC Devices due to configuration trigger, time trigger or another trigger condition, and the eNB may simulate a UE, which is similar to the case where the UE has accessed the eNB, and send an Attach Request (Attach Request) to an MME.

502. The MME sends a Create Session Request message to an S-GW after receiving the Attach Request.

503. The S-GW sends the Create Session Request message to a P-GW after receiving the Create Session Request message, where the Create Session Response message carries the IP address and TEID information of the S-GW. After receiving the Create Session Request message, the P-GW records the IP address and TEID information of the S-GW. In this way, a downlink path from the P-GW to the S-GW is established.

The IP address may be carried in a transferred GTP message parameter, or may be carried in the source address of a sent IP packet.

In addition, the Create Session Request message may also carry an information indication, where the information indication is used to indicate whether the P-GW needs to return the IP address or TEID information of the P-GW.

504. The P-GW establishes a tunnel with an MTC Server.

The established tunnel may be an IP in IP tunnel, a GRE tunnel, or an IPSEC tunnel. In addition, for the specific method for establishing the tunnel, reference may be made to the prior art, which is not detailed here.

505. The P-GW sends a Create Session Response message to the S-GW, where the Create Session Response message carries the IP address and TEID information of the P-GW. After receiving the Create Session Response message, the S-GW records the IP address and TEID information of the P-GW. In this way, an uplink path from the S-GW to the P-GW is established.

506. The S-GW sends the Create Session Response message to the MME, where the Create Session Response message carries the IP address and TEID information of the S-GW. After receiving the Create Session Response message, the MME obtains the IP address and TEID information of the S-GW from the received Create Session Response message.

507. The MME sends an Initial Context Setup Request/Attach Accept (Initial Context Setup Request/Attach Accept) message to the eNB, where the Context Setup Request/Attach Accept message carries the IP address and TEID information of the S-GW. After receiving the Context Setup Request/Attach Accept message, the eNB records the IP address and TEID information of the S-GW. In this way, an uplink path from the eNB to the S-GW is established.

508. The eNB sends an Initial Context Setup Response/Attach Complete (Initial Context Setup Response/Attach Complete) message to the MME, where the Initial Context Setup Response/Attach Complete message carries the IP address and TEID information of the eNB. After receiving the Initial Context Setup Response/Attach Complete message, the MME obtains the IP address and TEID information of the eNB from the Initial Context Setup Response/Attach Complete message.

509. The MME sends a Modify Bearer Request message to the S-GW, where the Modify Bearer Request message carries the IP address and TEID information of the eNB. After receiving the Modify Bearer Request message, the S-GW records the IP address and TEID information of the eNB. In this way, a downlink path from the S-GW to the eNB is established.

510. The S-GW sends a Modify Bearer Response message to the MME.

In addition, when the public path to be established is a part of a bidirectional path from the eNB to the MTC Server, some steps in the embodiment illustrated in FIG. 5 may be properly skipped during specific implementation. For example, if the public path to be established is a bidirectional path from the eNB to the P-GW, the public path may be established with step 504 in the embodiment illustrated in FIG. 5 skipped. If the public path to be established is a bidirectional path from the eNB to the S-GW, the public path may be established with steps 503 to 505 in the embodiment illustrated in FIG. 5 skipped. If the public path to be established is a bidirectional path from the S-GW to the P-GW, the public path may be established with steps 504, and 507 to 510 in the embodiment illustrated in FIG. 5 skipped.

Figure 6:
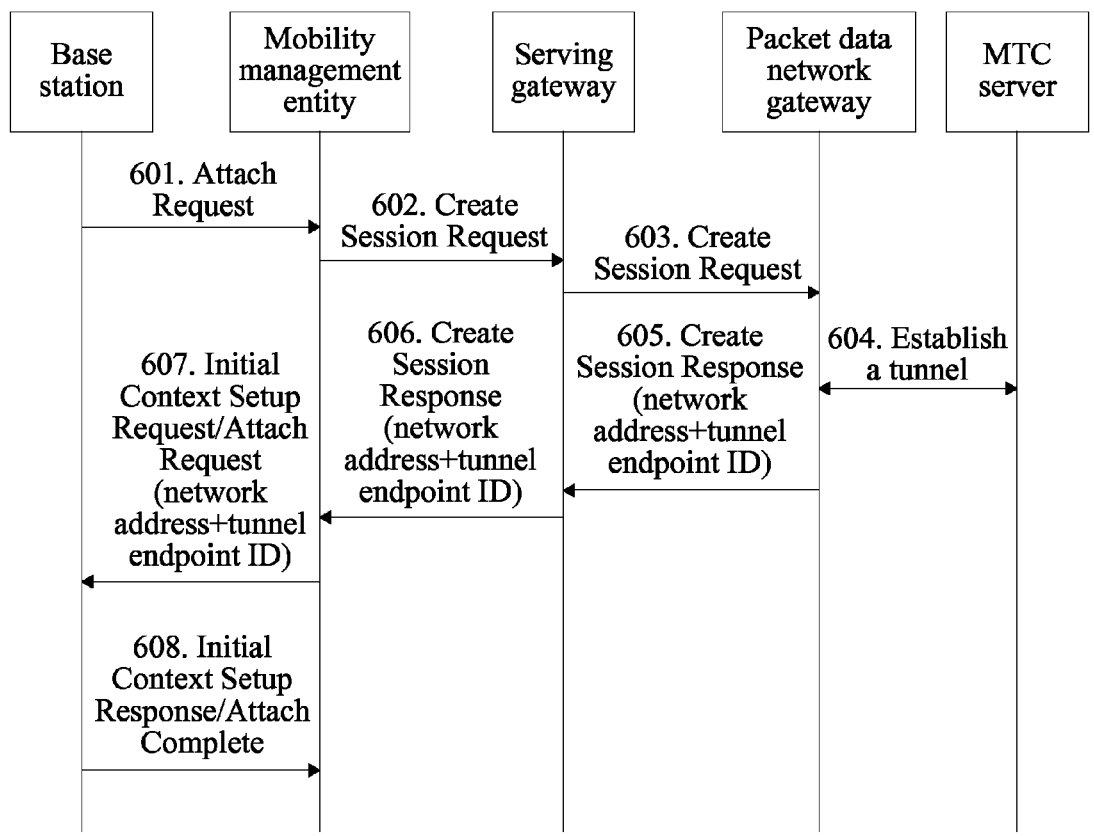
FIG. 6 is a schematic flow chart of a method for an eNB to trigger establishment of an uplink public path from the eNB to an MTC Server according to an embodiment of the present invention.

As shown in FIG. 6, in M2M communication according to this embodiment, a method that an eNB triggers establishment of an uplink public path from an eNB to an MTC Server includes:

601. An eNB determines to establish an uplink public path for a group of MTC Devices due to configuration trigger, time trigger or another trigger condition, and sends an Attach Request to an MME.

602. The MME sends a Create Session Request message to an S-GW after receiving the Attach Request.

603. The S-GW sends the Create Session Request message to a P-GW after receiving the Create Session Request message.

The Create Session Request message may also carry an information indication, where the information indication is used to indicate whether the P-GW needs to return the IP address or TEID information of the P-GW.

604. The P-GW establishes a tunnel with an MTC Server.

The established tunnel may be an IP in IP tunnel, a GRE tunnel, or an IPSEC tunnel. In addition, for the specific method for establishing the tunnel, reference may be made to the prior art, which is not detailed here.

605. The P-GW sends a Create Session Response message to the S-GW, where the Create Session Response message carries the IP address and TEID information of the P-GW. After receiving the Create Session Response message, the S-GW records the IP address and TEID information of the P-GW. In this way, an uplink path from the S-GW to the P-GW is established.

606. The S-GW sends the Create Session Response message to the MME, where the Create Session Response message carries the IP address and TEID information of the S-GW. After receiving the Create Session Response message, the MME obtains the IP address and TEID information of the S-GW from the received Create Session Response message.

607. The MME sends an Initial Context Setup Request/Attach Accept message to the eNB, where the Context Setup Request/Attach Accept message carries the IP address and TEID information of the S-GW. After receiving the Context Setup Request/Attach Accept message, the eNB records the IP address and TEID information of the S-GW. In this way, an uplink path from the eNB to the S-GW is established.

608. The eNB sends an Initial Context Setup Response/Attach Complete message to the MME.

In addition, when the public path to be established is a part of an uplink path from the eNB to the MTC Server, some steps in the embodiment illustrated in FIG. 6 may be properly skipped during specific implementation. For example, if the public path to be established is an uplink path from the eNB to the P-GW, the public path may be established with step 604 in the embodiment illustrated in FIG. 6 skipped.

Figure 7:
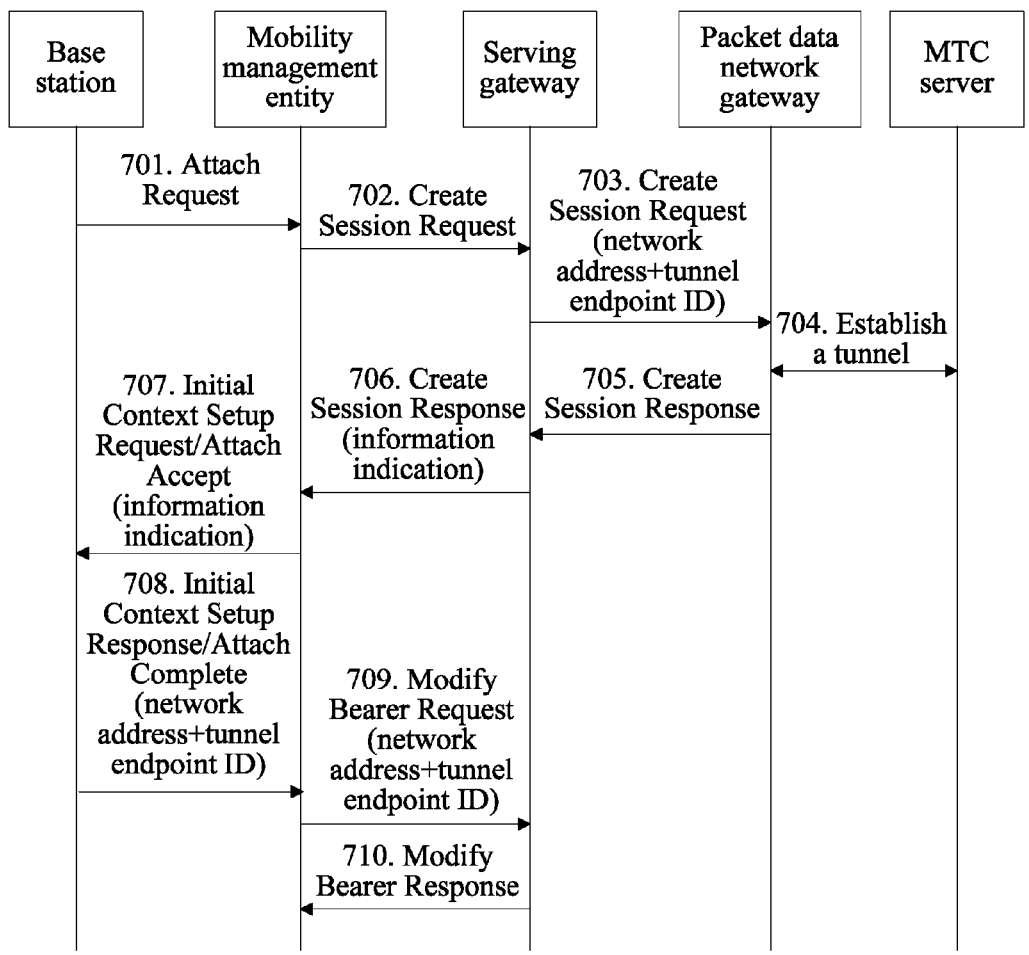
FIG. 7 is a schematic flow chart of a method for an eNB to trigger establishment of a downlink public path from the eNB to an MTC Server according to an embodiment of the present invention.

As shown in FIG. 7, in M2M communication according to this embodiment, a method that an eNB triggers establishment of a downlink public path from an eNB to an MTC Server includes:

701. An eNB determines to establish a downlink public path for a group of MTC Devices due to configuration trigger, time trigger or another trigger condition, and sends an Attach Request to an MME.

702. The MME sends a Create Session Request message to an S-GW after receiving the Attach Request.

703. The S-GW sends the Create Session Request message to a P-GW after receiving the Create Session Request message, where the Create Session Response message carries the IP address and TEID information of the S-GW. After receiving the Create Session Request message, the P-GW records the IP address and TEID information of the S-GW. In this way, a downlink path from the P-GW to the S-GW is established.

The IP address may be carried in a transferred GTP message parameter, or may be carried in the source address of a sent IP packet.

In addition, the Create Session Request message may also carry an information indication, where the information indication is used to indicate that the P-GW does not need to return the IP address or TEID information of the P-GW.

704. The P-GW establishes a tunnel with an MTC Server.

The established tunnel may be an IP in IP tunnel, a GRE tunnel, or an IPSEC tunnel. In addition, for the specific method for establishing the tunnel, reference may be made to the prior art, which is not detailed here.

705. The P-GW sends a Create Session Response message to the S-GW.

706. The S-GW sends a Create Session Response message to the MME, where the Create Session Response message carries an information indication, and the information indication is used to indicate that the eNB needs to return the IP address or TEID information of the P-GW.

707. The MME sends an Initial Context Setup Request/Attach Accept message to the eNB, where the Initial Context Setup Request/Attach Accept message carries an information indication, and the information indication is used to indicate that the eNB needs to return the IP address or TEID information of the P-GW.

708. The eNB sends an Initial Context Setup Response/Attach Complete message to the MME, where the Initial Context Setup Response/Attach Complete message carries the IP address and TEID information of the eNB. After receiving the Initial Context Setup Response/Attach Complete message, the MME obtains the IP address and TEID information of the eNB from the Initial Context Setup Response/Attach Complete message.

709. The MME sends a Modify Bearer Request message to the S-GW, where the Modify Bearer Request message carries the IP address and TEID information of the eNB. After receiving the Modify Bearer Request message, the S-GW records the IP address and TEID information of the eNB. In this way, a downlink path from the S-GW to the eNB is established.

710. The S-GW sends a Modify Bearer Response message to the MME.

In addition, when the public path to be established is a part of a downlink path from the eNB to the MTC Server, some steps in the embodiment illustrated in FIG. 7 may be properly skipped during specific implementation. For example, if the public path to be established is a downlink path from the eNB to the P-GW, the public path may be established with step 704 in the embodiment illustrated in FIG. 7 skipped.

103. The MTC device in the one-line transmission group performs data transmission with an MTC server by using the public path.

For example, during access of the MTC device in the one-line transmission group, a radio bearer is established for the MTC device in the one-line transmission group; when the public path is an uplink path or a bidirectional path, a mapping relationship between the established radio bearer and the public path is set in the base station; and when the MTC device in the one-line transmission group sends uplink data by using the established radio bearer, the base station determines a corresponding public path according to the set mapping relationship between the radio bearer and the public path, and sends the uplink data to the MTC server by using the determined public path. When the public path is a downlink path or a bidirectional path, a mapping relationship between the established radio bearer and the public path is set in the base station, and a mapping relationship between MTC device information or network address and the radio bearer is set; when the MTC server sends downlink data by using the public path, the base station determines a corresponding radio bearer according to the MTC device information in the downlink data or the set mapping relationship between the MTC device information and the radio bearer, or according to the network address in the downlink data and the set mapping relationship between the network address of the MTC device and the radio bearer; and the base station sends the downlink data to the corresponding MTC device by using the determined radio bearer. For example, filters (filtering) may be established for different radio bearers of different MTC devices in the base station. Attributes of different MTC devices are set by using the filters, including information such as the IP address and/or device ID and/or communication port. A set of attributes corresponds to a radio bearer. The base station determines, by using the filters, to which radio bearer the downlink data is to be sent.

If a public path from an eNB to a P-GW is established, before the MTC Device sends data, the IP address of the MTC Device needs to be obtained. The IP address may be obtained during the Attach process, or may be assigned by an access network before data transmission. However, if a public path from an eNB to an MTC Server is established, no IP address may be assigned to the MTC Device. The MTC Server receives data of each MTC Device over the same path, and is capable of distinguishing different MTC Devices by using only an application ID or a device ID included in the data. The following uses the public paths from an eNB to an MTC Server and from an eNB to a P-GW as examples to describe in further detail the communication method using the public path.

Figure 8:
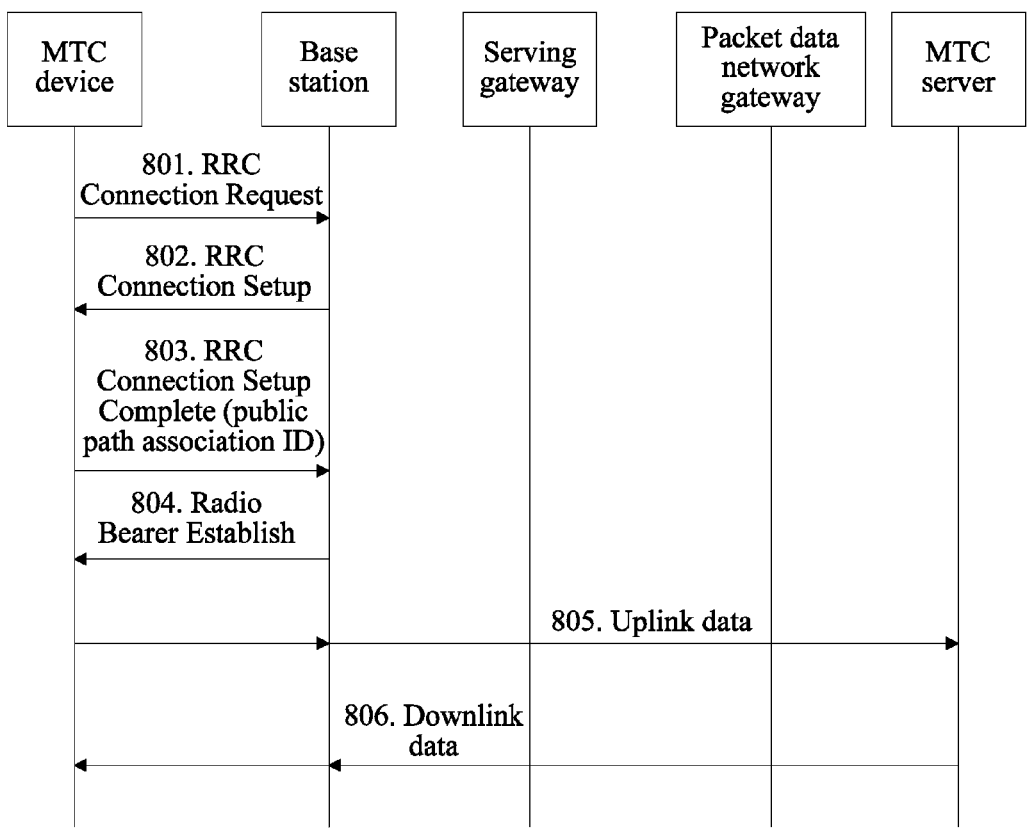
FIG. 8 is a schematic flow chart of a communication method using a public path from an eNB to an MTC Server according to an embodiment of the present invention.

As shown in FIG. 8, in M2M communication according to this embodiment, a communication method using a public path from an eNB to an MTC Server includes:

801. An MTC Device sends an RRC Connection Request message to an eNB.

802. The eNB sends an RRC Connection Setup (RRC Connection Setup) message to the MTC Device after receiving the RRC Connection Request message.

803. The MTC Device sends an RRC Connection Setup Complete (RRC Connection Setup Complete) message to the eNB after receiving the RRC Connection Setup message, where the RRC Connection Setup Complete message carries a public path association ID.

The public path association ID may be, for example, a group ID, a device ID, or a public path ID. In addition, a NAS message may also be carried in the RRC Connection Request message. In this case, because the bearer is established, the eNB may not transfer the NAS to the MME, or even may not conduct any interaction with the MME, or only conducts an interaction of a security authentication operation with the MME but the MME does not need to perform a Create Bearer operation.

In addition, the public path association ID may also not be carried in the RRC Connection Setup Complete message, but is carried in the RRC Connection Request message.

804. The eNB sends a Radio Bearer Setup (RB Setup) message to the MTC Device. The eNB associates the MTC Device with the public path according to the public path association ID.

For example, when the public path is an uplink path, that is, the MTC Device only uploads data to an MTC Server, the eNB may associate, according to the public path association ID, an RB (Radio Bearer, radio bearer) established for the MTC Device with a public path corresponding to the MTC Device. When the public path is a downlink path, that is, the MTC Device only downloads data from the MTC Server, the eNB may associate, according to the public path association ID, an RB established for the MTC Device with a public path corresponding to the MTC Device, and associates the device ID with the RB established for the MTC Device. When the public path is a bidirectional path, that is, the MTC Device both uploads data to and downloads data from the MTC Server, the eNB may associate, according to the public association ID, an RB established for the MTC Device with a public path corresponding to the MTC Device, and associates the device ID with the RB established for the MTC Device.

805. The MTC Device sends uplink data by using the RB, and the eNB transfers the uplink data to the MTC Server by using the corresponding public path after receiving the uplink data.

In this embodiment, the public path is a path from the eNB to the MTC Server. In this case, the IP address of the MTC Device may not necessarily be obtained. After the MTC Server receives data of each MTC Device over one same path, the MTC Server is capable of distinguishing different MTC Devices by using only an application ID or a device ID included in the data. Therefore, the uplink data may be raw data without an IP header or data added with an IP header.

For example, assuming that a plurality of MTC Devices accesses a network and belongs to the same group and uses the same public path, the eNB establishes respective RBs for these MTC Devices. When an MTC Device uploads data by using an RB, the eNB receives the data by using the RB and uploads the received data to the MTC Server by using a corresponding public path. In addition, the MTC Server is also capable of distinguishing, according to the device ID or application layer ID in the data, the MTC Device from which the data comes.

806. The MTC Server sends downlink data by using the corresponding public path. After receiving the downlink data, the eNB determines a corresponding RB according to the device ID in the downlink data, and transfers the downlink data to the corresponding MTC Device by using the RB.

In this embodiment, the downlink data may be raw data without an IP header or data added with an IP header.

For example, when the MTC Server delivers data, the eNB receives the data by using the corresponding public path, determines a corresponding RB according to the device ID carried in the received data, and delivers the data to the MTC Device by using the RB.

In this embodiment, the MTC Device may also not carry any NAS message; alternatively, the eNB may also directly establish an RB after receiving the RRC Connection Request message.

Figure 9:
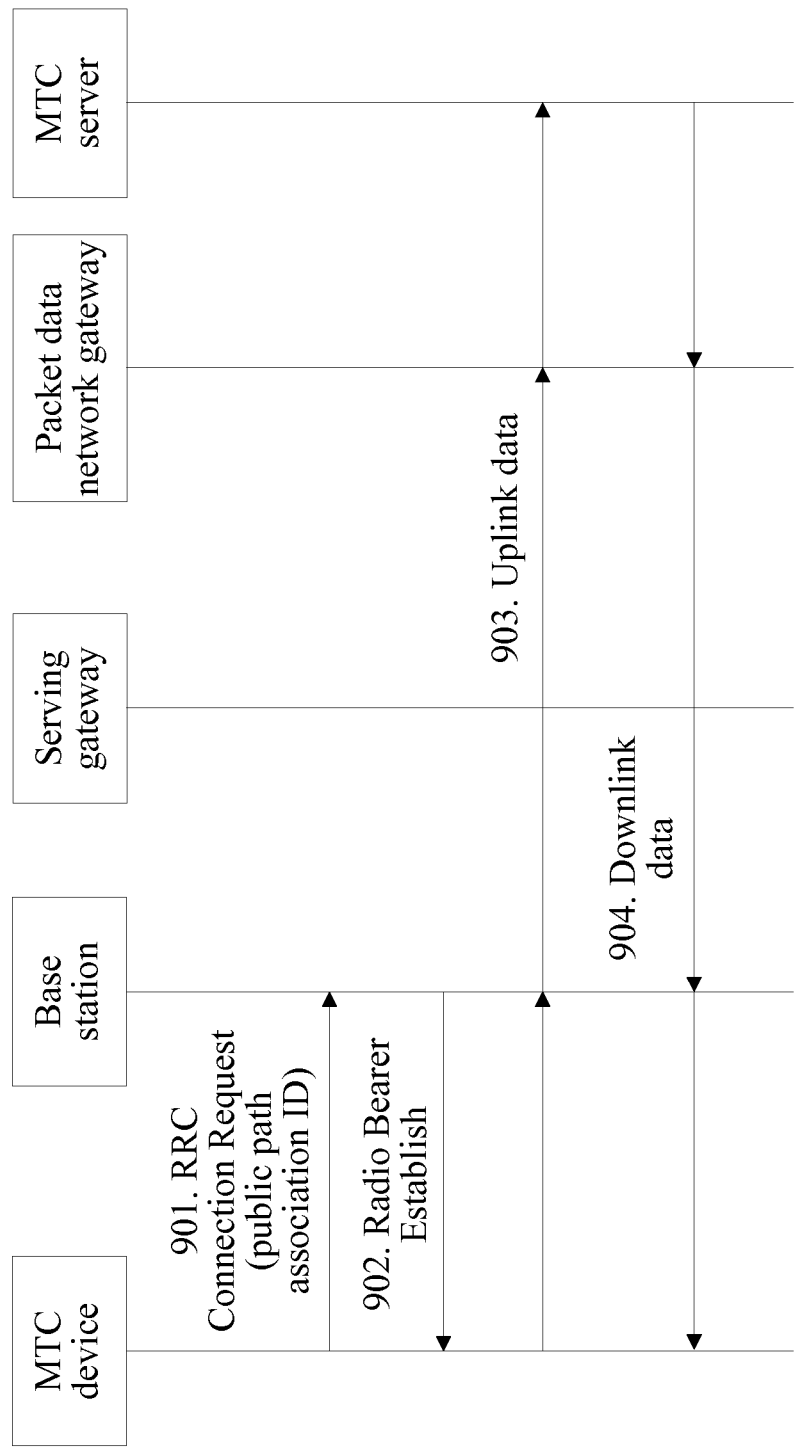
FIG. 9 is a schematic flow chart of a communication method using a public path from an eNB to a P-GW according to an embodiment of the present invention.

As shown in FIG. 9, in M2M communication according to this embodiment, a communication method using a public path from an eNB to a P-GW includes:

901. An MTC Device sends an RRC Connection Request message to an eNB, where the RRC Connection Request message carries a public path association ID.

The public path association ID may be, for example, a group ID, a device ID, or a public path ID.

In this embodiment, the network from the outside of a P-GW to an MTC Server is an IP network. Therefore, when data sent by the MTC Device must have an IP packet header when being transmitted out of the P-GW.

902. The eNB sends a Radio Bearer Establish message to the MTC Device. The eNB associates the MTC Device with the public path according to the public path association ID.

When the public path is an uplink path, that is, the MTC Device only uploads data to the MTC Server, the eNB may associate, according to the public path association ID, an RB established for the MTC Device with a public path corresponding to the MTC Device. When the public path is a downlink path, that is, the MTC Device only downloads data from the MTC Server, the eNB may associate, according to the public path association ID, an RB established for the MTC Device with a public path corresponding to the MTC Device, and associates the device ID with the RB established for the MTC Device. When the public path is a bidirectional path, that is, the MTC Device both uploads data to and downloads data from the MTC Server, the eNB may associate, according to the public path association ID, an RB established for the MTC Device with a public path corresponding to the MTC Device, and associates the device ID or the IP address information of the MTC Device with the RB established for the MTC Device.

903. The MTC Device sends uplink data by using the RB. After receiving the uplink data, the eNB transfers the uplink data to the P-GW by using the corresponding public path. The P-GW transfers the uplink data to the MTC Server.

When the public path is a path from the eNB to the MTC Server, the IP address of the MTC Device may not necessarily be obtained. This is because after receiving data of each MTC device over one same path, the MTC Server is capable of distinguishing different MTC Devices by using only an application ID or a device ID included in the data. However, in this embodiment, the public path is a path from the eNB to the P-GW. In this case, the IP address of the MTC Device needs to be obtained, and the IP address of the MTC Device sending the uplink data needs to be added in the uplink data. In addition, the IP address may be obtained during the Attach process, or may be assigned by an access network before data transmission.

For example, the eNB may assign the same or different IP addresses to each MTC Device during access of the MTC Devices. Each MTC device sends data carrying an IP address assigned to it to the eNB by using the RB. After receiving the uplink data, the eNB transfers the uplink data to the P-GW by using the corresponding public path. The P-GW sends the uplink data to the corresponding MTC Server according to the IP address in the uplink data.

Alternatively, the eNB does not assign an IP address to an MTC device, but adds an IP packet header with a destination address being an MTC server to uplink data when the MTC Device sends the raw uplink data by using an RB. The eNB transfers the uplink data to the P-GW by using the corresponding public path, and the P-GW sends the uplink data to the corresponding MTC Server according to the destination address in the uplink data.

Alternatively, the eNB does not assign an IP address to an MTC device. When the MTC device sends raw uplink data by using an RB, the eNB transfers the uplink data to the P-GW by using the corresponding public path. The P-GW adds an IP packet header to the uplink data after receiving the uplink data, and sends the uplink data added with the IP packet header to the corresponding MTC Server.

904. The MTC Server sends downlink data. After receiving the downlink data, the P-GW transfers the downlink data to the eNB by using the corresponding public path. After receiving the downlink data, the eNB determines a corresponding RB according to the IP address or device ID in the downlink data, and transfers the downlink data to the corresponding MTC Device by using the RB.

For example, the eNB may assign different IP addresses to each MTC device during access. The eNB sets a mapping relationship between IP quintuple information (that is, source IP address, destination IP address, source port number, destination port number, and protocol name) of an MTC Device and an RB. The P-GW sets a mapping relationship between the IP address segment of an MTC Device and a public path. The MTC Server sends downlink data carrying IP address information. After receiving the downlink data, the P-GW determines the corresponding public path according to the IP address information in the downlink data, and transfers the downlink data to the eNB by using the public path. After receiving the downlink data, the eNB determines a corresponding RB according to the IP address information in the downlink data, and transfers the downlink data to the corresponding MTC Device by using the RB. For example, assuming that one eNB has a group of 1000 devices sharing one public path and all these devices send data during 3:00-4:00 a.m., but do not concurrently access the eNB, and randomly access the eNB in a distributed manner instead, each device accesses the eNB for five minutes to transfer data and no longer accesses the eNB after the data is transferred. The eNB maintains 150 IP addresses for the group of devices. Each device is assigned with an IP address when accessing the eNB and releases the IP address after the access is completed. Subsequently, when another device accesses the eNB, the released IP address is assigned to the device. Therefore, in principle, a maximum of 150 devices are allowed to access the eNB at the same time. After a public path is established at 2:59 a.m., the P-GW records a mapping relationship between the 150 IP addresses and the public path. Each time assigning an IP address to an MTC Device, the eNB associates the RB corresponding to the MTC Device with the IP address. After an MTC Device sends uplink data (the source address of the data is the IP address assigned thereto, the source port is the port number assigned to the MTC Device, the destination address is the IP address of an MCT Server, and the destination port is the port of the MTC Server), the MCT Server returns a piece of data in response to the MTC Device. In the IP packet header of the returned data, the destination address is the IP address of the MTC Device, and the destination port is the port of the MTC Device. After receiving the returned data, the P-GW determines, according to information such as the destination address (that is, the IP address of the MTC Device) and the destination port, that the data should be sent to the public path rather than another path. Then, the P-GW sends the data to the eNB by using the public path. After receiving the data, the eNB determines, according to the information such as the destination address (that is, the IP address of the MTC Device) and the destination port, an RB corresponding to the MTC Device, and sends the data to the MTC Device by using the RB.

Alternatively, the eNB may also assign the same IP address to each MTC device. Each MTC device sends data information related to the IP address to the eNB. The eNB sets a mapping relationship between an MTC device ID and an RB. The P-GW sets a mapping relationship between the IP address of an MTC Device and a public path. The MTC Server sends downlink data carrying the IP address assigned to the MTC Devices. After receiving the downlink data, the P-GW determines a public path according to the IP address of the MTC Devices in the downlink data, and transfers the downlink data to the eNB by using the public path. After receiving the downlink data, the eNB determines a corresponding RB according to the device ID in the downlink data, and transfers the downlink data to a corresponding MTC Device by using the RB.

Alternatively, the MTC Server sends downlink data carrying a specific IP address. After receiving the downlink data, the P-GW determines a public path according to the IP address in the downlink data, and transfers the downlink data to the eNB by using the public path. After receiving the downlink data, the eNB determines a corresponding RB according to the device ID in the downlink data, and transfers the downlink data to a corresponding MTC Device by using the RB.

The above describes a conventional connection-based method (that is, an RB exists on a radio interface). In addition, a connectionless-based method may also be adopted to use a public path. For example, an MTC Device does not send an RRC Connection Request to establish a signaling connection and an RB data connection, but directly sends data to an eNB on a specific time-frequency resource. The eNB determines an associated public path according to ID information (for example, a group ID) in the received data, and sends the data to an MTC Server or a P-GW by using the public path. However, after receiving the data from the MTC Server or the P-GW by using the public path, the eNB directly sends the data to a corresponding MTC Device on a specific time-frequency resource according to the ID information or IP address in the data.

104. Release the public path when the data transmission between the MTC device in the one-line transmission group and the MTC server is completed.

The following uses the case where deletion of a public path is triggered by an MME as an example to describe in further detail a process of deleting a public path.

Figure 10:
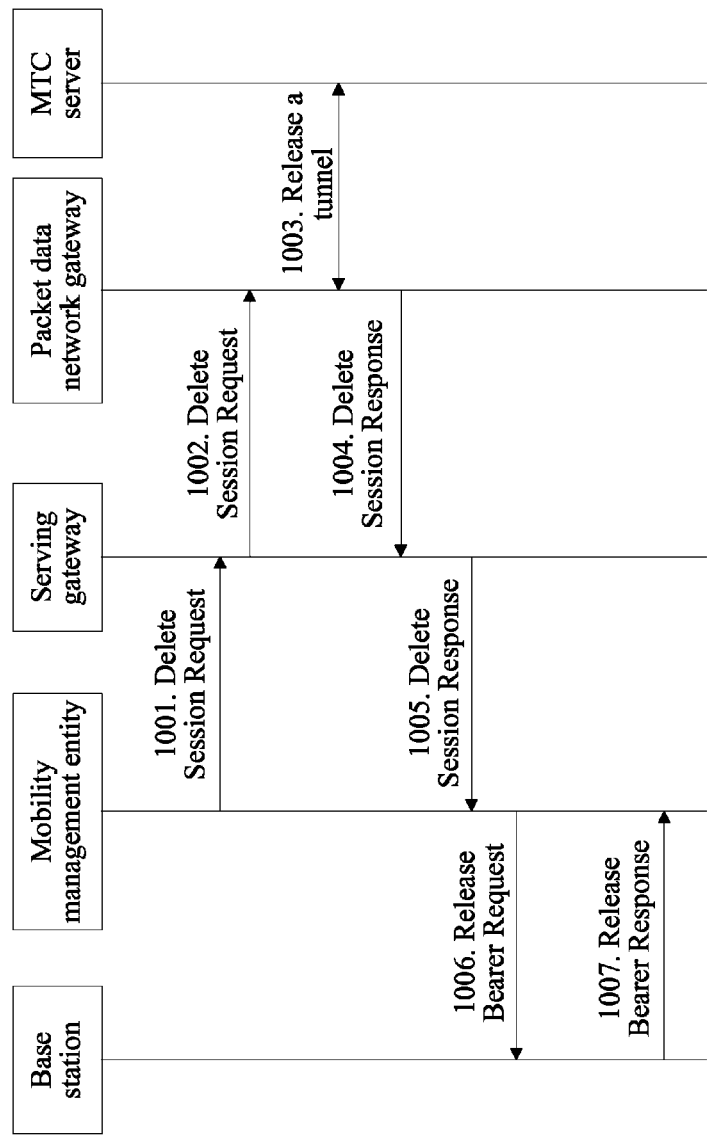
FIG. 10 is a schematic flow chart of a method for an MME to trigger deletion of a public path from an eNB to an MTC Server according to an embodiment of the present invention.

As shown in FIG. 10, in M2M communication according to this embodiment, a method that an MME triggers deletion of a public path from an eNB to an MTC Server includes:

1001. An MME determines to delete a public path established for a group of MTC Devices due to configuration trigger, time trigger or another trigger condition, and sends a Delete Session Request (Delete Session Request) message to an S-GW.

1002. The S-GW sends the Delete Session Request message to a P-GW.

1003. The P-GW releases a tunnel with an MTC Server.

1004. The P-GW sends a Delete Session Response (Delete Session Response) message to the S-GW.

1005. The S-GW sends the Delete Session Response message to the MME.

1006. The MME sends a Release Bearer Request (Release Bearer Request) message to an eNB.

1007. The eNB sends a Release Bearer Response (Release Bearer Response) message to the MME.

In addition, when the established public path is a part of a path from the eNB to the MTC Server, some steps in the embodiment illustrated in FIG. 10 may be properly skipped during specific implementation. For example, if the established public path is a path from the eNB to the P-GW, the public path may be released with step 1003 in the embodiment illustrated in FIG. 10 skipped. For example, if the established public path is a path from the eNB to the S-GW, the public path may be released with steps 1002 to 1004 in the embodiment illustrated in FIG. 10 skipped. For example, if the established public path is a path from the S-GW to the P-GW, the public path may be released with steps 1003, 1006, and 1007 in the embodiment illustrated in FIG. 10 skipped.

In addition, when the public path whose establishment is triggered by the eNB needs to be deleted, the eNB may simulate a bearer delete or detach (Detach) process of a normal UE to delete the public path.

According to the M2M communication method provided in this embodiment, characteristic information of a public path is obtained, where the public path is corresponding to an MTC device in a one-line transmission group; the public path is established according to the characteristic information; and the MTC device in the one-line transmission group performs data transmission with an MTC server by using the public path and releases the public path when the data transmission between the MTC device in the one-line transmission group and the MTC server is completed. Therefore, when MTC Devices in the same group perform data transmission with the MTC Server, the public path involves only operations of establishing and releasing a bearer once, thereby reducing signaling transmission between nodes. In this way, the occupied network resources in the M2M communication are reduced and the service processing efficiency of an M2M network is improved.

Figure 11:
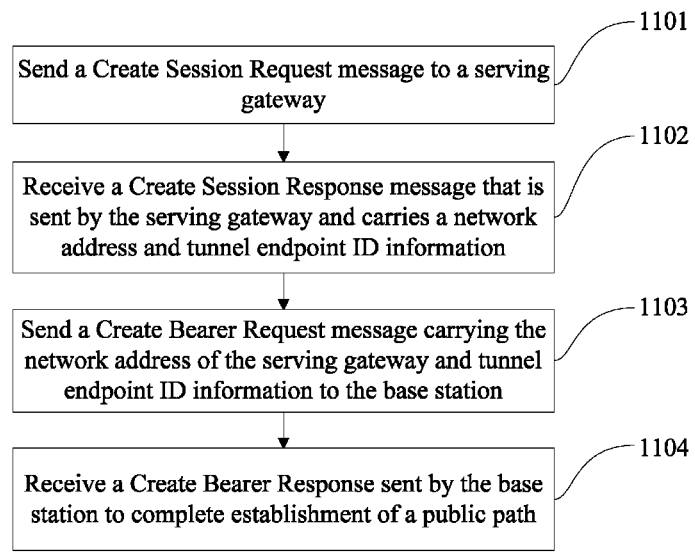
FIG. 11 is a schematic flow chart of a method for establishing a public path in a wireless communication network according to an embodiment of the present invention.

Further, an embodiment of the present invention provides a method for establishing a public path in a wireless communication network, as shown in FIG. 11, including:

1101. A mobility management entity sends a Create Session Request message to a serving gateway.

For example, the mobility management entity may send the Create Session Request message to the serving gateway when a trigger condition for establishing a public path is satisfied, where the trigger condition for establishing the public path includes a preset configuration condition, a preset start time, or an operation instruction delivered by a network management system/maintenance system.

In this embodiment, the established public path includes a path between a base station and the serving gateway, a path among the base station, the serving gateway and a packet data network gateway, or a path among the base station, the serving gateway, the packet data network gateway and an MTC server. In addition, the established public path is a unidirectional uplink path or a bidirectional path.

1102. The mobility management entity (MME) receives a Create Session Response message sent by the serving gateway, where the Create Session Response message is a response to the Create Session Request message and carries a network address of the serving gateway and tunnel endpoint ID information.

For example, using the case where the established public path is a bidirectional path among the eNB, the S-GW, a P-GW, and the MTC Server as an example, after receiving the Create Session Request message sent by the MME, the S-GW sends the Create Session Request message to the P-GW, where the Create Session Request message carries the IP address and TEID information of the S-GW. After receiving the Create Session Request message sent by the S-GW, the P-GW records the IP address and TEID information of the S-GW in the Create Session Request message. In this way, a tunnel is established between the P-GW and the MTC Server. In addition, the P-GW sends the Create Session Response message to the S-GW, where the Create Session Response message carries the IP address and TEID information of the P-GW. After receiving the Create Session Response message sent by the P-GW, the S-GW records the IP address and TEID information of the P-GW in the Create Session Response message. In addition, the S-GW sends the Create Session Response message to the MME, where the Create Session Response message carries the IP address and TEID information of the S-GW.

1103. The mobility management entity sends a Create Bearer Request message to the base station, where the Create Bearer Request message carries the network address of the serving gateway and tunnel endpoint ID information.

1104. The mobility management entity receives a Create Bearer Request Response sent by the base station to complete establishment of the public path.

For example, using the case where the public path includes a path between the MME and the eNB as an example, after receiving the Create Bearer Request Response sent by the eNB, the MME sends a Modify Bearer Request message to the S-GW, where the Modify Bearer Request message carries the IP address and TEID information of the eNB. After receiving the Modify Bearer Request message, the S-GW records the IP address and TEID information of the eNB, and sends a Modify Bearer Response message to the MME.

According to the method for establishing a public path in a wireless communication network provided in this embodiment, a mobility management entity sends a Create Session Request message to a serving gateway, receives a Create Session Response message that is sent by the serving gateway and carries the network address of the serving gateway and tunnel endpoint ID information, sends a Create Bearer Request message carrying the network address of the serving gateway and tunnel endpoint ID information to a base station, and receives a Create Bearer Request Response sent by the base station to complete establishment of the public path. Therefore, when MTC Devices in the same group perform data transmission with the MTC Server, the public path involves only an operation of establishing a bearer once, thereby reducing signaling transmission between nodes. In this way, the occupied network resources in the M2M communication are reduced and the service processing efficiency of an M2M network is improved.

Figure 12:
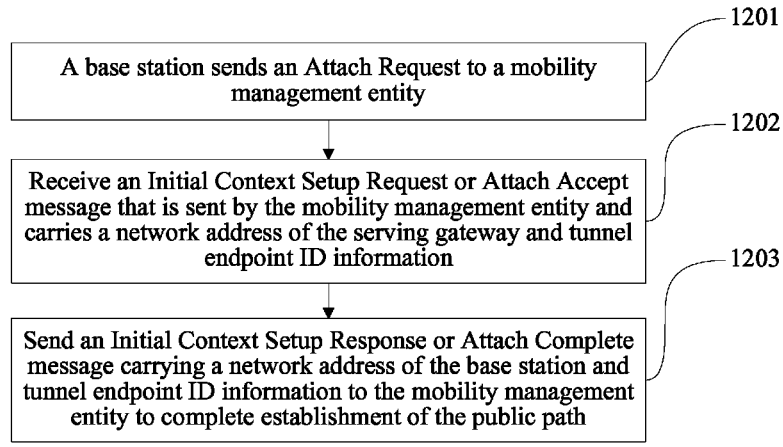
FIG. 12 is a schematic flow chart of another method for establishing a public path in a wireless communication network according to an embodiment of the present invention.

In addition, an embodiment of the present invention provides a method for establishing a public path in a wireless communication network, as shown in FIG. 12, including:

1201. A base station sends an Attach Request to a mobility management entity.

For example, the base station may send the Attach Request to the mobility management entity when a trigger condition for establishing a public path is satisfied, where the trigger condition for establishing the public path includes a preset configuration condition, a preset start time, or an operation instruction delivered by a network management system/maintenance system.

In this embodiment, the established public path includes a path between the base station and a serving gateway, a path among the base station, the serving gateway and a packet data network gateway, or a path among the base station, the serving gateway, the packet data network gateway and an MTC server. In addition, the established public path is a unidirectional uplink path or a bidirectional path.

1202. The base station receives an Initial Context Setup Request or Attach Accept message sent by the mobility management entity, where the Initial Context Setup Request or Attach Accept message is a response to the Attach Request and carries a network address of the serving gateway and tunnel endpoint ID information.

For example, using the case where the established public path is a bidirectional path among the eNB, the S-GW, a P-GW, and the MTC Server as an example, after receiving the Attach Request, the MME sends a Create Session Request message to the S-GW. After receiving the Create Session Request message, the S-GW sends the Create Session Request message to the P-GW, where the Create Session Request message carries the IP address and TEID information of the S-GW. After receiving the Create Session Request message, the P-GW records the IP address and TEID information of the S-GW, establishes a tunnel with the MTC Server, and sends a Create Session Response message to the S-GW, where the Create Session Response message carries the IP address and TEID information of the P-GW. After receiving the Create Session Response message, the S-GW records the IP address and TEID information of the P-GW, and sends the Create Session Response message to the MME, where the Create Session Response message carries the IP address and TEID information of the S-GW. After receiving the Create Session Response message, the MME sends the Initial Context Setup Request or Attach Accept message to the eNB, where the Initial Context Setup Request or Attach Accept message carries the IP address and TEID information of the S-GW.

1203. The base station sends an Initial Context Setup Response or Attach Complete message to the mobility management entity to complete establishment of the public path, where the Initial Context Setup Response or Attach Complete message carries a network address of the base station and tunnel endpoint ID information.

For example, after receiving the Initial Context Setup Response or Attach Complete message, the MME sends a Modify Bearer Request message to the S-GW, where the Modify Bearer Request message carries the IP address and TEID information of the eNB. After receiving the Modify Bearer Request message, the S-GW records the IP address and TEID information of the eNB, and sends a Modify Bearer Response message to the MME.

According to the method for establishing a public path in a wireless communication network provided in this embodiment, a base station sends an Attach Request to a mobility management entity, receives an Initial Context Setup Request or Attach Accept message that is sent by the mobility management entity and carries the network address and tunnel endpoint ID information of a serving gateway, and sends an Initial Context Setup Response or Attach Complete message carrying the network address of the base station and tunnel endpoint ID information to the mobility management entity to complete establishment of the public path. Therefore, when MTC Devices in the same group perform data transmission with the MTC Server, the public path involves only an operation of establishing a bearer once, thereby reducing signaling transmission between nodes. In this way, the occupied network resources in the M2M communication are reduced and the service processing efficiency of an M2M network is improved.

Figure 13:
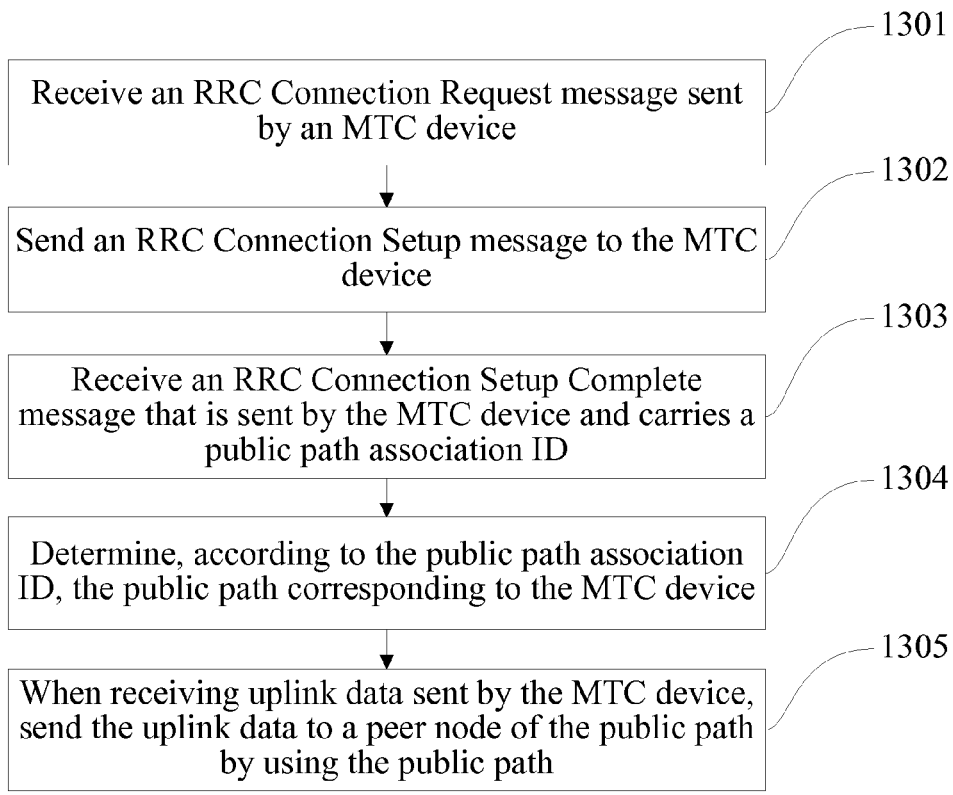
FIG. 13 is a schematic flow chart of a method for using a public path in a wireless communication network according to an embodiment of the present invention.

In addition, an embodiment of the present invention provides a method for using a unidirectional uplink public path in a wireless communication network, as shown in FIG. 13, including:

1301. A base station receives an RRC Connection Request message sent by an MTC device.

In this embodiment, the used public path is a unidirectional uplink public path, including an uplink path between the base station and a serving gateway, an uplink path among the base station, the serving gateway and a packet data network gateway, or an uplink path among the base station, the serving gateway, the packet data network gateway and an MTC server; alternatively, the public path is a bidirectional public path, including a bidirectional path between the base station and a serving gateway, a bidirectional path among the base station, the serving gateway and a packet data network gateway, or a bidirectional path among the base station, the serving gateway, the packet data network gateway and an MTC server.

1302. The base station sends an RRC Connection Setup message to the MTC device.

1303. The base station receives an RRC Connection Setup Complete message sent by the MTC device, where the RRC Connection Setup Complete message carries a public path association ID.

1304. The base station determines, according to the public path association ID, the public path corresponding to the MTC device.

For example, the base station may determine, according to the public path association ID, a unidirectional uplink public path corresponding to the MTC device. Alternatively, the base station may determine, according to the public path association ID, a bidirectional public path corresponding to the MTC device.

1305. When receiving uplink data sent by the MTC device, the base station sends the uplink data to a peer node of the public path by using the public path.

For example, the base station may send the uplink data to a peer node of the unidirectional uplink public path by using the unidirectional uplink public path when receiving the uplink data sent by the MTC device. Alternatively, the base station may send the uplink data to a peer node of the bidirectional public path by using the bidirectional public path when receiving the uplink data sent by the MTC device.

In addition, when receiving downlink data from a peer node of the bidirectional public path by using the bidirectional public path, the base station may determine a corresponding MTC device according to a device ID in the downlink data, and send the downlink data to the determined MTC device.

According to the method for using a public path in a wireless communication network provided in this embodiment, a base station receives an RRC Connection Request message sent by an MTC device, sends an RRC Connection Setup message to the MTC device, receives an RRC Connection Setup Complete message that is sent by the MTC device and carries the public path association ID, determines, according to the public path association ID, the public path corresponding to the MTC device, and sends uplink data to a peer node of the public path by using the public path when receiving the uplink data sent by the MTC device. Therefore, when MTC Devices in the same group perform data transmission with the MTC Server, the public path involves only an operation of establishing a bearer once, thereby reducing signaling transmission between nodes. In this way, the occupied network resources in the M2M communication are reduced and the service processing efficiency of an M2M network is improved.

Figure 14:
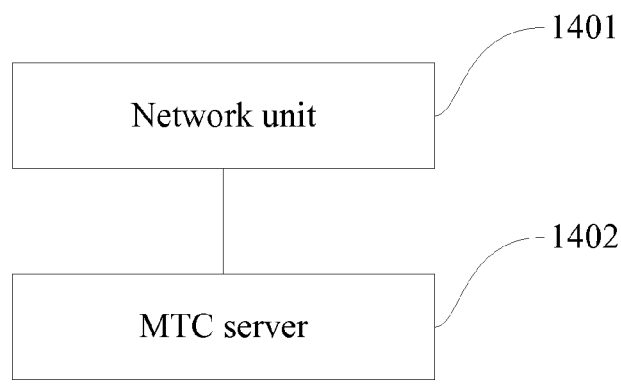
FIG. 14 is a schematic structural diagram of an M2M communication system according to an embodiment of the present invention.

Corresponding to the above method, an embodiment of the present invention further provides an M2M communication system, as shown in FIG. 14, including:

a network unit 1401, configured to obtain characteristic information of a public path, where the public path is corresponding to an MTC device in a one-line transmission group; establish the public path according to the characteristic information; and release the public path when data transmission between the MTC device in the one-line transmission group and an MTC server 1402 is completed; and the MTC server 1402, configured to perform data transmission with the MTC device in the one-line communication group by using the public path corresponding to the MTC device in the one-line communication group.

Further, the network unit 1401 is specifically configured to determine, according to the characteristic information, a first node and a last node of the public path and a data transmission direction of the public path; establish a tunnel between the first node and the last node; and store, in a node of the tunnel, the network address and interface information of an upper-level node of the node in the case of uplink data transmission; store, in a node of the tunnel, the network address and interface information of a lower-level node of the node in the case of downlink data transmission; or store, in a node of the tunnel, the network addresses and interface information of an upper-level node and a lower-level node of the node in the case of uplink and downlink data transmission.

Further, the network unit 1401 is further specifically configured to establish a radio bearer for the MTC device in the one-line transmission group; and set, in the base station, a mapping relationship between the established radio bearer and the public path; where when the MTC device in the one-line transmission group sends uplink data by using the established radio bearer, the base station determines a corresponding public path according to the set mapping relationship between the radio bearer and the public path, and sends the uplink data to the MTC server by using the determined public path.

Further, the network unit 1401 is further specifically configured to establish a radio bearer for the MTC device in the one-line transmission group; and set, in the base station, a mapping relationship between the established radio bearer and the public path, and a mapping relationship between MTC device information and the radio bearer; where when the MTC server sends downlink data by using the public path, the base station determines a corresponding radio bearer according to the MTC device information in the downlink data and the set mapping relationship between the MTC device information and the radio bearer, and sends the downlink data to the corresponding MTC device by using the determined radio bearer.

Further, the network unit 1401 is further specifically configured to establish a radio bearer for the MTC device in the one-line transmission group and assign a network address to the MTC device in the one-line transmission group; and set, in the base station, a mapping relationship between the established radio bearer and the public path, and a mapping relationship between the network address of the MTC device and the radio bearer; where when the MTC server sends downlink data by using the public path, the base station determines a corresponding radio bearer according to the network address in the downlink data and the set mapping relationship between the network address of the MTC device and the radio bearer, and sends the downlink data to the corresponding MTC device by using the determined radio bearer.

According to the M2M communication system provided in this embodiment, characteristic information of a public path is obtained, where the public path is corresponding to an MTC device in a one-line transmission group; the public path is established according to the characteristic information; and the MTC device in the one-line transmission group performs data transmission with an MTC server by using the public path and releases the public path when the data transmission between the MTC device in the one-line transmission group and the MTC server is completed. Therefore, when MTC Devices in the same group perform data transmission with the MTC Server, the public path involves only operations of establishing and releasing a bearer once, thereby reducing signaling transmission between nodes. In this way, the occupied network resources in the M2M communication are reduced and the service processing efficiency of an M2M network is improved.

Figure 15:
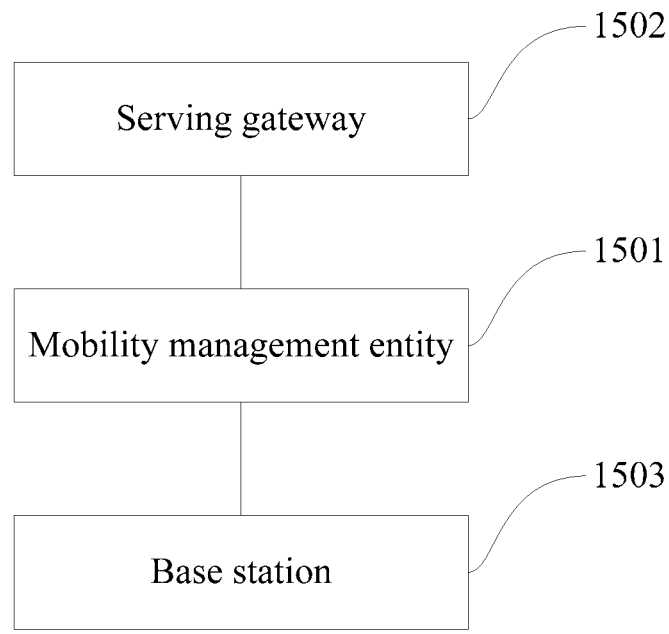
FIG. 15 is a schematic structural diagram of a system for establishing a public path in a wireless communication network according to an embodiment of the present invention.

In addition, an embodiment of the present invention provides a system for establishing a public path in a wireless communication network, as shown in FIG. 15, including:

a mobility management entity 1501, configured to send a Create Session Request message to a serving gateway 1502; receive a Create Session Response message sent by the serving gateway 1502; send a Create Bearer Request message to a base station 1503, where the Create Bearer Request message carries the network address of the serving gateway and tunnel endpoint ID information 1502; and receive a Create Bearer Request Response sent by the base station 1503 to complete establishment of the public path;

the serving gateway 1502, configured to receive the Create Session Request message sent by the mobility management entity 1501; and send the Create Session Response message to the mobility management entity 1501, where the Create Session Response message carries the network address of the serving gateway and tunnel endpoint ID information 1502; and the base station 1503, configured to receive the Create Bearer Request message sent by the mobility management entity 1501; and send the Create Bearer Request Response to the mobility management entity 1501.

Further, the mobility management entity 1501 is specifically configured to, when a trigger condition for establishing the public path is satisfied, send the Create Session Request message to the serving gateway 1502, where the trigger condition for establishing the public path includes a preset configuration condition, a preset start time, or an operation instruction delivered by a network management system/maintenance system.

The public path includes a path between the base station and the serving gateway, a path among the base station, the serving gateway and a packet data network gateway, or a path among the base station, the serving gateway, the packet data network gateway and an MTC server. The public path is a unidirectional uplink path or a bidirectional path.

According to the system for establishing a public path in a wireless communication network provided in this embodiment, a mobility management entity sends a Create Session Request message to a serving gateway, receives a Create Session Response message that is sent by the serving gateway and carries the network address of the serving gateway and tunnel endpoint ID information, sends a Create Bearer Request message carrying the network address of the serving gateway and tunnel endpoint ID information to a base station, and receives a Create Bearer Request Response sent by the base station to complete establishment of the public path. Therefore, when MTC Devices in the same group perform data transmission with the MTC Server, the public path involves only an operation of establishing a bearer once, thereby reducing signaling transmission between nodes. In this way, the occupied network resources in the M2M communication are reduced and the service processing efficiency of an M2M network is improved.

Figure 16:
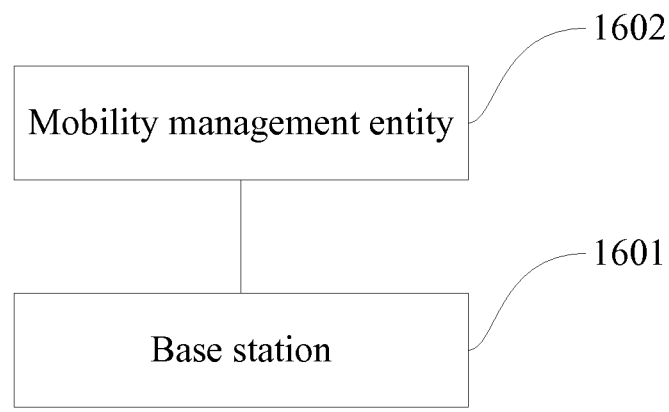
FIG. 16 is a schematic structural diagram of another system for establishing a public path in a wireless communication network according to an embodiment of the present invention.

In addition, an embodiment of the present invention provides a system for establishing a public path in a wireless communication network, as shown in FIG. 16, including:

a base station 1601, configured to send an Attach Request to a mobility management entity 1602; receive an Initial Context Setup Request or Attach Accept message sent by the mobility management entity 1602; and send an Initial Context Setup Response or Attach Complete message to the mobility management entity 1602 to complete establishment of the public path, where the Initial Context Setup Response or Attach Complete message carries a network address of the base station 1601 and tunnel endpoint ID information; and the mobility management entity 1602, configured to receive the Attach Request sent by the base station 1601; obtain the network address and tunnel endpoint ID information of a serving gateway; send the Initial Context Setup Request or Attach Accept message to the base station 1601, where the Initial Context Setup Request or Attach Accept message carries the network address of the serving gateway and tunnel endpoint ID information; and receive the Initial Context Setup Response or Attach Complete message sent by the base station 1601.

Further, the base station 1601 is specifically configured to, when a trigger condition for establishing the public path is satisfied, send the Attach Request to the mobility management entity 1602, where the trigger condition for establishing the public path includes a preset configuration condition, a preset start time, or an operation instruction delivered by a network management system/maintenance system.

The public path includes a path between the base station and the serving gateway, a path among the base station, the serving gateway and a packet data network gateway, or a path among the base station, the serving gateway, the packet data network gateway and an MTC server. The public path is a unidirectional uplink path or a bidirectional path.

According to the system for establishing a public path in a wireless communication network provided in this embodiment, a base station sends an Attach Request to a mobility management entity, receives an Initial Context Setup Request or Attach Accept message that is sent by the mobility management entity and carries the network address and tunnel endpoint ID information of a serving gateway, and sends an Initial Context Setup Response or Attach Complete message carrying the network address of the base station and tunnel endpoint ID information to the mobility management entity to complete establishment of the public path. Therefore, when MTC Devices in the same group perform data transmission with the MTC Server, the public path involves only an operation of establishing a bearer once, thereby reducing signaling transmission between nodes. In this way, the occupied network resources in the M2M communication are reduced and the service processing efficiency of an M2M network is improved.

Figure 17:
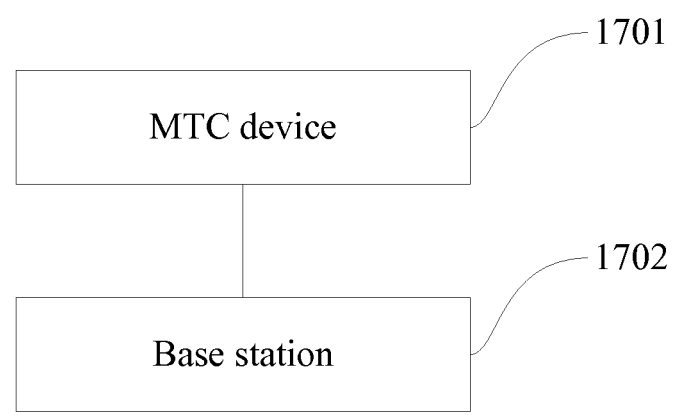
FIG. 17 is a schematic structural diagram of a system for using a public path in a wireless communication network according to an embodiment of the present invention.

In addition, an embodiment of the present invention provides a system for using a public path in a wireless communication network, as shown in FIG. 17, including:

an MTC device 1701, configured to send an RRC Connection Request message to a base station 1702; receive an RRC Connection Setup message sent by the base station 1702; and send an RRC Connection Setup Complete message to the base station 1702, where the RRC Connection Setup Complete message carries a public path association ID; and the base station 1702, configured to receive the RRC Connection Request message sent by the MTC device 1701; send the RRC Connection Setup message to the MTC device 1701; receive the RRC Connection Setup Complete message sent by the MTC device 1701; determine, according to the public path association ID in the RRC Connection Setup Complete message, the public path corresponding to the MTC device 1701; and send uplink data to a peer node of the public path by using the public path when receiving the uplink data sent by the MTC device 1701.

Further, the base station 1702 is specifically configured to determine, according to the public path association ID, a unidirectional uplink public path corresponding to the MTC device 1701; and send uplink data to a peer node of the unidirectional uplink public path by using the unidirectional uplink public path when receiving the uplink data sent by the MTC device 1701.

Alternatively, the base station 1702 is specifically configured to determine, according to the public path association ID, a bidirectional public path corresponding to the MTC device 1701; and send uplink data to a peer node of the bidirectional public path by using the bidirectional public path when receiving the uplink data sent by the MTC device 1701.

Further, the base station 1702 is configured to, when receiving downlink data from a peer node of the bidirectional public path by using the bidirectional public path, determine a corresponding MTC device 1701 according to a device ID in the downlink data, and send the downlink data to the determined MTC device 1701.

In this embodiment, the public path is a unidirectional uplink public path, including an uplink path between the base station and a serving gateway, an uplink path among the base station, the serving gateway and a packet data network gateway, or an uplink path among the base station, the serving gateway, the packet data network gateway and an MTC server; alternatively, the public path is a bidirectional public path, including a bidirectional path between the base station and a serving gateway, a bidirectional path among the base station, the serving gateway and a packet data network gateway, or a bidirectional path among the base station, the serving gateway, the packet data network gateway and an MTC server.

Persons of ordinary skill in the art should understand that all or a part of the processes of the methods in the embodiments may be implemented by a computer program instructing relevant hardware. The program may be stored in a computer readable storage medium. When the program is run, the processes of the methods in the embodiments are performed. The storage medium may be a magnetic disk, an optical disk, a read-only memory (Read-Only Memory, ROM), a random access memory (Read-Only Memory, RAM), and the like.

The foregoing descriptions are merely exemplary embodiments of the present invention, but not intended to limit the present invention. Any variation or replacement made by persons skilled in the art without departing from the spirit of the present invention shall fall within the protection scope of the present invention. Therefore, the protection scope of the present invention shall be subject to the appended claims.

The invention claimed is:

1. A method of establishing a public path in a wireless communication network, comprising:
   sending, by a mobility management entity (MME), a Create Session Request message to a serving gateway;
   receiving, by the MME, a Create Session Response message sent by the serving gateway, wherein the Create Session Response message is a response to the Create Session Request message and carries a network address of the serving gateway and tunnel endpoint ID information;
   sending, by the MME, a Create Bearer Request message to a base station, wherein the Create Bearer Request message carries the network address of the serving gateway and the tunnel endpoint ID information; and
   receiving, by the MME, a Create Bearer Request Response sent by the base station to complete establishment of the public path.

2. The method according to claim 1, wherein the public path comprises one of (a) a path between the base station and the serving gateway, (b) a path among the base station, the serving gateway and a packet data network gateway, and (c) a path among the base station, the serving gateway, the packet data network gateway and a Machine Type Communication (MTC) server.

3. A method of establishing a public path in a wireless communication network, comprising:
   sending, by a base station, an Attach Request to a mobility management entity;
   receiving an Initial Context Setup Request or Attach Accept message sent by the mobility management entity, wherein the Initial Context Setup Request or Attach Accept message is a response to the Attach Request and carries a network address of a serving gateway and tunnel endpoint ID information; and
   sending an Initial Context Setup Response or Attach Complete message to the mobility management entity to complete establishment of the public path, wherein the Initial Context Setup Response or Attach Complete message carries a network address of the base station and the tunnel endpoint ID information.

4. The method according to claim 3, wherein the public path comprises one of (a) a path between the base station and the serving gateway, (b) a path among the base station, the serving gateway and a packet data network gateway, and (c) a path among the base station, the serving gateway, the packet data network gateway and an MTC server.

5. A Machine to Machine (M2M) communication method, comprising:
   obtaining characteristic information at a node in a public path for routing data along a common transmission route from more than one Machine Type Communication (MTC) device;
   establishing, by the node, the common transmission route of the public path according to the characteristic information, wherein the public path provides for data transmission between the more than one MTC device and an MTC server;
   wherein the data transmission via the public path is implemented by the following:
   establishing a radio bearer for the more than one MTC device;
   setting, in a base station, a mapping relationship between the established radio bearer and the public path, and another mapping relationship between MTC device information and the radio bearer;
   when the MTC server sends downlink data using the public path, determining, by the base station, a corresponding radio bearer according to the MTC device information in the downlink data and the another mapping relationship between the MTC device information and the radio bearer; and
   sending, by the base station, the downlink data to the corresponding more than one MTC device using the determined radio bearer.

6. The method according to claim 5, the method further comprising:
   releasing, by the node, the public path when the data transmission between the more than one MTC device and the MTC server is completed.

7. The method according to claim 5, wherein establishing the common transmission route of the public path according to the characteristic information comprises:
   determining, according to the characteristic information, a first node and a last node of the public path and a data transmission direction of the public path; and
   establishing a tunnel between the first node and the last node.

8. A system for establishing a public path in a wireless communication network, comprising:
   a mobility management entity, configured to send a Create Session Request message to a serving gateway; receive a Create Session Response message sent by the serving gateway; send a Create Bearer Request message to a base station, wherein the Create Bearer Request message carries a network address of the serving gateway and tunnel endpoint ID information; and receive a Create Bearer Request Response sent by the base station to complete establishment of the public path;
   the serving gateway, configured to receive the Create Session Request message sent by the mobility management entity; and send the Create Session Response message to the mobility management entity, wherein the Create Session Response message carries the network address of the serving gateway and the tunnel endpoint ID information; and
   the base station, configured to receive the Create Bearer Request message sent by the mobility management entity; and send the Create Bearer Request Response to the mobility management entity.

9. The system according to claim 8, wherein the public path comprises one of (a) a path between the base station and the serving gateway, (b) a path among the base station, the serving gateway and a packet data network gateway, and (c) a path among the base station, the serving gateway, the packet data network gateway and a Machine Type Communication (MTC) server.

10. The system according to claim 8, wherein the public path is a unidirectional uplink path or a bidirectional path.

11. A system of establishing a public path in a wireless communication network, comprising:
   a base station, configured to send an Attach Request to a mobility management entity; receive an Initial Context Setup Request or Attach Accept message sent by the mobility management entity; and send an Initial Context Setup Response or Attach Complete message to the mobility management entity to complete establishment of the public path, wherein the Initial Context Setup Response or Attach Complete message carries a network address of the base station and tunnel endpoint ID information; and the mobility management entity, configured to receive the Attach Request sent by the base station; obtain a network address of a serving gateway and the tunnel endpoint ID information; send the Initial Context Setup Request or Attach Accept message to the base station, wherein the Initial Context Setup Request or Attach Accept message carries the network address of the serving gateway and the tunnel endpoint ID information; and receive the Initial Context Setup Response or Attach Complete message sent by the base station.

12. The system according to claim 11, wherein the base station is configured to, when a trigger condition for establishing the public path is satisfied, send the Attach Request to the mobility management entity, wherein the trigger condition for establishing the public path comprises one of (a) a preset configuration condition, (b) a preset start time, and (c) an operation instruction delivered by a network management system/maintenance system.

13. The system according to claim 11, wherein the public path comprises one of (a) a path between the base station and the serving gateway, (b) a path among the base station, the serving gateway and a packet data network gateway, and (c) a path among the base station, the serving gateway, the packet data network gateway and a Machine Type Communication (MTC) server.

14. A system for using a unidirectional uplink public path in a wireless communication network, comprising:
 a Machine Type Communication (MTC) device, configured to send a Radio Resource Control (RRC) Connection Request message to a base station; receive an RRC Connection Setup message sent by the base station; and send an RRC Connection Setup Complete message to the base station, wherein the RRC Connection Setup Complete message carries a public path association ID comprising one of a group ID and a public path ID; and
 the base station, configured to receive the RRC Connection Request message sent by the MTC device; send the RRC Connection Setup message to the MTC device; receive the RRC Connection Setup Complete message sent by the MTC device; determine, according to the public path association ID in the RRC Connection Setup Complete message, a public path corresponding to the MTC device; and send uplink data to a peer node of the public path by using the public path when receiving the uplink data sent by the MTC device.

15. The system according to claim 14, wherein the base station is configured to determine, according to the public path association ID, the unidirectional uplink public path corresponding to the MTC device; and send the uplink data to a peer node of the unidirectional uplink public path by using the unidirectional uplink public path when receiving the uplink data sent by the MTC device.

16. The system according to claim 15, wherein the base station is configured to determine, according to the public path association ID, a bidirectional public path corresponding to the MTC device; and send the uplink data to a peer node of the bidirectional public path by using the bidirectional public path when receiving the uplink data sent by the MTC device.

17. The system according to claim 15, wherein the base station is further configured to, when receiving downlink data from a peer node of a bidirectional public path by using the bidirectional public path, determine a corresponding MTC device according to a device ID in the downlink data, and send the downlink data to the determined MTC device.

18. The system according to claim 15, wherein the public path is one of (a) and (b):
 (a) a unidirectional uplink public path, comprising one of (i) an uplink path between the base station and a serving gateway, (ii) an uplink path among the base station, the serving gateway and a packet data network gateway, and (iii) an uplink path among the base station, the serving gateway, the packet data network gateway and an MTC server; and
 (b) a bidirectional public path, comprising (1) a bidirectional path between the base station and a serving gateway, (2) a bidirectional path among the base station, the serving gateway and a packet data network gateway, and (3) a bidirectional path among the base station, the serving gateway, the packet data network gateway and an MTC server.

19. A Machine to Machine (M2M) communication method, comprising:
 obtaining characteristic information at a node in a public path for routing data along a common transmission route from more than one Machine Type Communication (MTC) device;
 establishing, by the node, the common transmission route of the public path according to the characteristic information, wherein the public path provides for data transmission between the more than one MTC device and an MTC server;
 wherein the data transmission via the public path is implemented by the following:
 establishing a radio bearer for more than one MTC device and assigning a network address to the more than one MTC device;
 setting, in a base station, a mapping relationship between the established radio bearer and the public path, and another mapping relationship between the network address of the more than one MTC device and the radio bearer;
 when the MTC server sends downlink data using the public path, determining, by the base station, a corresponding radio bearer according to the network address in the downlink data and the another mapping relationship between the network address of the more than one MTC device and the radio bearer; and
 sending, by the base station, the downlink data to the corresponding more than one MTC device using the determined radio bearer.

20. The method according to claim 19, the method further comprising:
 releasing, by the node, the public path when the data transmission between the more than one MTC device and the MTC server is completed.

21. The method according to claim 19, wherein establishing the common transmission route of the public path according to the characteristic information comprises:
 determining, according to the characteristic information, a first node and a last node of the public path and a data transmission direction of the public path; and
 establishing a tunnel between the first node and the last node.

* * * * *